United States Patent
Ethington et al.

(10) Patent No.: US 11,732,632 B1
(45) Date of Patent: Aug. 22, 2023

(54) SYSTEMS AND METHODS FOR DETERMINING AN EFFICIENCY VALUE ASSOCIATED WITH A CATALYST MEMBER

(71) Applicant: Cummins Emission Solutions Inc., Columbus, IN (US)

(72) Inventors: Cami Brigette Ethington, Nashville, IN (US); Premjee Sasidharan, Columbus, IN (US); Huiling Li, Columbus, IN (US); Varun Sood, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/876,863

(22) Filed: Jul. 29, 2022

(51) Int. Cl.
  *F01N 11/00* (2006.01)
  *F01N 3/28* (2006.01)
  *F01N 3/20* (2006.01)

(52) U.S. Cl.
  CPC .......... *F01N 11/002* (2013.01); *F01N 3/2066* (2013.01); *F01N 3/28* (2013.01);
  (Continued)

(58) Field of Classification Search
  CPC ........ F01N 11/002; F01N 3/2066; F01N 3/28; F01N 2370/02; F01N 2550/02;
  (Continued)

(56) References Cited

U.S. PATENT DOCUMENTS

| 8,091,416 B2 * | 1/2012 | Wang | F01N 3/2066 73/114.75 |
| 8,245,567 B2 * | 8/2012 | Wang | F01N 11/007 73/114.75 |

(Continued)

FOREIGN PATENT DOCUMENTS

WO    WO-2021/183322 A1    9/2021

OTHER PUBLICATIONS

Thomas McKinley et al.; "Identifying NOx Sensor Failure for Predictive Maintenance of Diesel Engines Using Explainable AI", European Conference of the Prognostics and Health Management Society 2020; pp. 1-10.

*Primary Examiner* — Jesse S Bogue
(74) *Attorney, Agent, or Firm* — Foley & Lardner LLP

(57) ABSTRACT

A system comprising an aftertreatment system comprising: a catalyst member, and a first exhaust conduit upstream of the catalyst member; a first temperature sensor operatively coupled to the catalyst member; a flow sensor coupled to the first exhaust conduit; and a controller. The controller determines a temperature of the catalyst member, a flow rate of exhaust within the first exhaust conduit, and a space velocity of the exhaust within the catalyst member. The controller determines a first degradation value indicative of a degradation of the catalyst member. The controller determines a first difference between the first degradation value and a first degradation reference value and a second difference between the first degradation value and a second degradation reference value. After determining that the first difference is less than the second difference, the controller selects a first calibration metric. The controller determines a first efficiency value associated with the catalyst member.

20 Claims, 10 Drawing Sheets

(52) U.S. Cl.
CPC ...... *F01N 2370/02* (2013.01); *F01N 2550/02* (2013.01); *F01N 2570/14* (2013.01); *F01N 2610/1453* (2013.01); *F01N 2900/0421* (2013.01); *F01N 2900/1411* (2013.01); *F01N 2900/1602* (2013.01); *F01N 2900/1621* (2013.01)

(58) Field of Classification Search
CPC ......... F01N 2570/14; F01N 2610/1453; F01N 2900/0421; F01N 2900/1411; F01N 2900/1602; F01N 2900/1621
See application file for complete search history.

(56) References Cited

U.S. PATENT DOCUMENTS

| | | |
|---|---|---|
| 8,726,723 B2 | 5/2014 | Clerc et al. |
| 8,955,309 B2 * | 2/2015 | Yacoub ................... F01N 3/208 60/274 |
| 9,297,286 B2 | 3/2016 | Kruer et al. |
| 9,909,517 B2 * | 3/2018 | Kothandaraman ......................... F02D 41/2422 |
| 10,113,464 B2 * | 10/2018 | David ..................... F01N 3/208 |
| 10,253,734 B2 | 4/2019 | Jammoussi et al. |
| 2016/0279574 A1 | 9/2016 | Devarakonda |
| 2018/0101639 A1 | 4/2018 | Nanda et al. |
| 2019/0093535 A1 | 3/2019 | Devarakonda et al. |
| 2019/0093540 A1 | 3/2019 | Devarakonda et al. |
| 2020/0065690 A1 | 2/2020 | Neri et al. |
| 2023/0003152 A1 * | 1/2023 | Clerc ...................... F01N 3/106 |
| 2023/0028415 A1 * | 1/2023 | Meier ....................... F01N 9/00 |

* cited by examiner

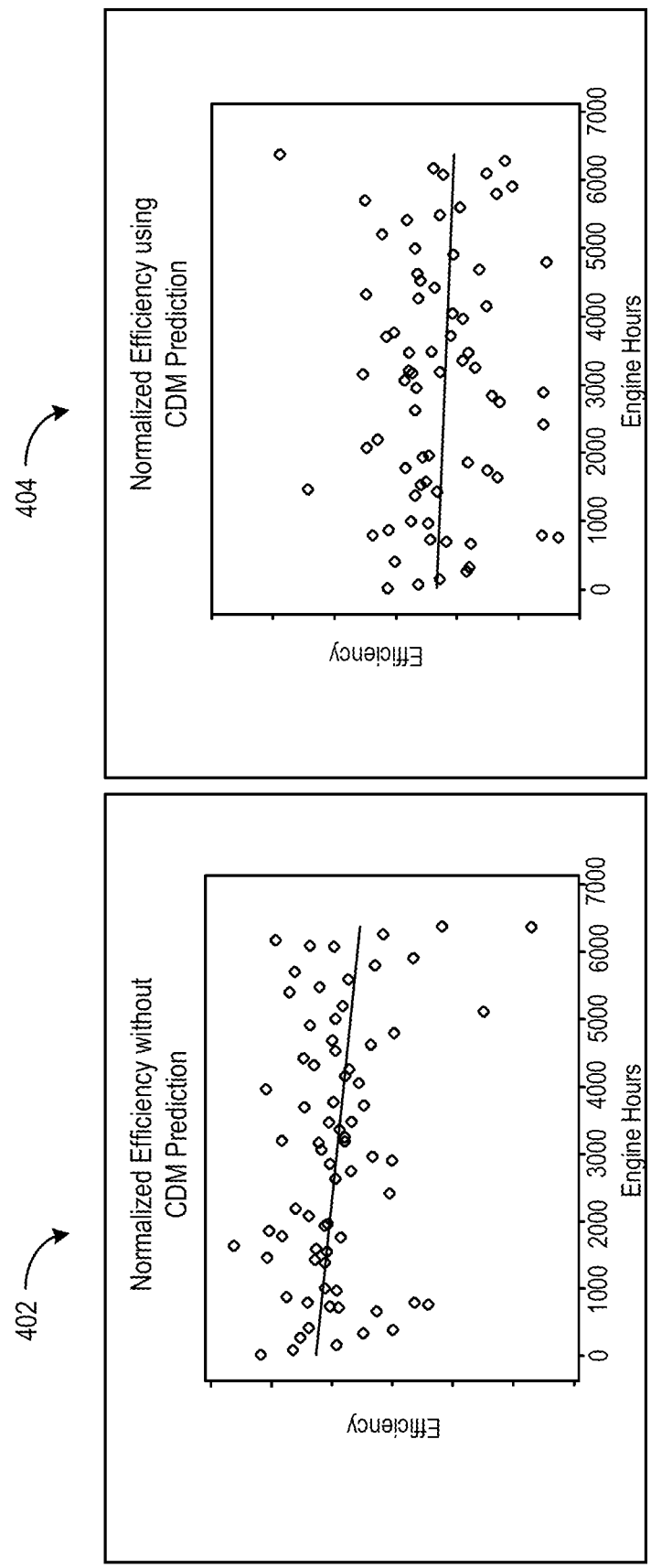

SYSTEMS AND METHODS FOR DETERMINING AN EFFICIENCY VALUE ASSOCIATED WITH A CATALYST MEMBER

TECHNICAL FIELD

The present application relates generally to systems and methods for determining an efficiency value associated with a catalyst member.

BACKGROUND

Internal combustion engines, such as diesel engines, emit exhaust that includes nitrogen oxide ($NO_x$) compounds. It may be desirable to reduce $NO_x$ emissions, for example, to comply with environmental regulations. To reduce $NO_x$ emissions, a reductant may be dosed into the exhaust by a dosing system in an aftertreatment system. The reductant cooperates with a catalyst of a catalyst member to facilitate conversion of a portion of the exhaust into non-$NO_x$ emissions, such as nitrogen ($N_2$), carbon dioxide ($CO_2$), and water ($H_2O$), thereby reducing $NO_x$ emissions.

In some applications, these compounds of the exhaust can be filtered or removed by one or more catalyst members (e.g., a diesel oxidation catalyst (DOC) member, a select catalytic reduction (SCR) catalyst member, diesel particulate filter (DPF) member, an ammonia oxidation (AMOx) catalyst member, etc.) located in an aftertreatment system. In such applications, it is desirable to maintain the operability, condition, or performance of the catalyst member(s) to ensure reliable measurement results. Typically, the condition of the catalyst member(s) may be evaluated during routine maintenance of certain systems. In some cases, a fault code or an indication of failure of the catalyst member(s) is provided to the operator after the catalyst member(s) have already failed or degraded.

SUMMARY

In some embodiments, a system includes an aftertreatment system. The aftertreatment system can comprise a catalyst member. The aftertreatment system can comprise a first exhaust conduit upstream of the catalyst member. The system includes a first temperature sensor operatively coupled to the catalyst member and configured to provide a first signal. The system includes a flow sensor coupled to the first exhaust conduit and configured to provide a second signal. The system includes a controller communicable with the first temperature sensor and the flow sensor. The controller can receive the first signal from the first temperature sensor and the second signal from the flow sensor. The controller can determine, based on the first signal, a temperature of the catalyst member. The controller can determine, based on the second signal, a flow rate of exhaust within the first exhaust conduit. The controller can determine, based on the flow rate and a volume of the catalyst member, a space velocity of the exhaust within the catalyst member. The controller can determine, based on historical operation data associated with the catalyst member and a characteristic of the catalyst member, a first degradation value indicative of a degradation of the catalyst member. The controller can determine a first difference between the first degradation value and a first degradation reference value. The controller can determine a second difference between the first degradation value and a second degradation reference value. The controller can after determining that the first difference is less than the second difference, select a first calibration metric associated with the first degradation reference value. The controller can determine, using the first calibration metric and based on the space velocity and the temperature, a first efficiency value associated with the catalyst member.

In some other embodiments, a method can comprise receiving, by a controller communicable with a temperature sensor and a flow sensor, a first signal from the temperature sensor and a second signal from the flow sensor. The method can comprise determining, by the controller based on the first signal, a temperature of a catalyst member of an aftertreatment system. The method can comprise determining, by the controller based on the second signal, a flow rate of exhaust within an exhaust conduit of the aftertreatment system. The method can comprise determining, by the controller based on the flow rate and a volume of the catalyst member, a space velocity of the exhaust within the catalyst member. The method can comprise determining, by the controller based on historical operation data of the catalyst member and a characteristic of the catalyst member, a first degradation value indicative of a degradation of the catalyst member. The method can comprise determining, by the controller, a first difference between the first degradation value and a first degradation reference value. The method can comprise determining, by the controller, a second difference between the first degradation value and a second degradation reference value. The method can comprise selecting, by the controller, a first calibration metric associated with the first degradation reference value after determining that the first difference is less than the second difference. The method can comprise determining, by the controller, using the first calibration metric and based on the space velocity and the temperature, a first efficiency value associated with the catalyst member.

In yet some embodiments, a non-transitory computer-readable medium can comprise at least one processor coupled to at least one memory storing instructions that, when executed by the at least one processor, cause the non-transitory computer-readable medium to receive a first signal from a temperature sensor and a second signal from a flow sensor. The non-transitory computer-readable medium can determine, based on the first signal, a temperature of a catalyst member of an aftertreatment system. The non-transitory computer-readable medium can determine, based on the second signal, a flow rate of exhaust within an exhaust conduit of the aftertreatment system. The non-transitory computer-readable medium can determine, based on the flow rate and a volume of the catalyst member, a space velocity of the exhaust within the catalyst member. The non-transitory computer-readable medium can determine, based on historical operation data of the catalyst member and a characteristic of the catalyst member, a first degradation value indicative of a degradation of the catalyst member. The non-transitory computer-readable medium can determine, a first difference between the first degradation value and a first degradation reference value. The non-transitory computer-readable medium can determine, a second difference between the first degradation value and a second degradation reference value. The non-transitory computer-readable medium can select a first calibration metric associated with the first degradation reference value after determining that the first difference is less than the second difference. The non-transitory computer-readable medium can determine, using the first calibration metric and based on the space velocity and the temperature, a first efficiency value associated with the catalyst member.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIGS. 4A-B illustrate example graphs of normalized efficiency values;

Figure 1A:
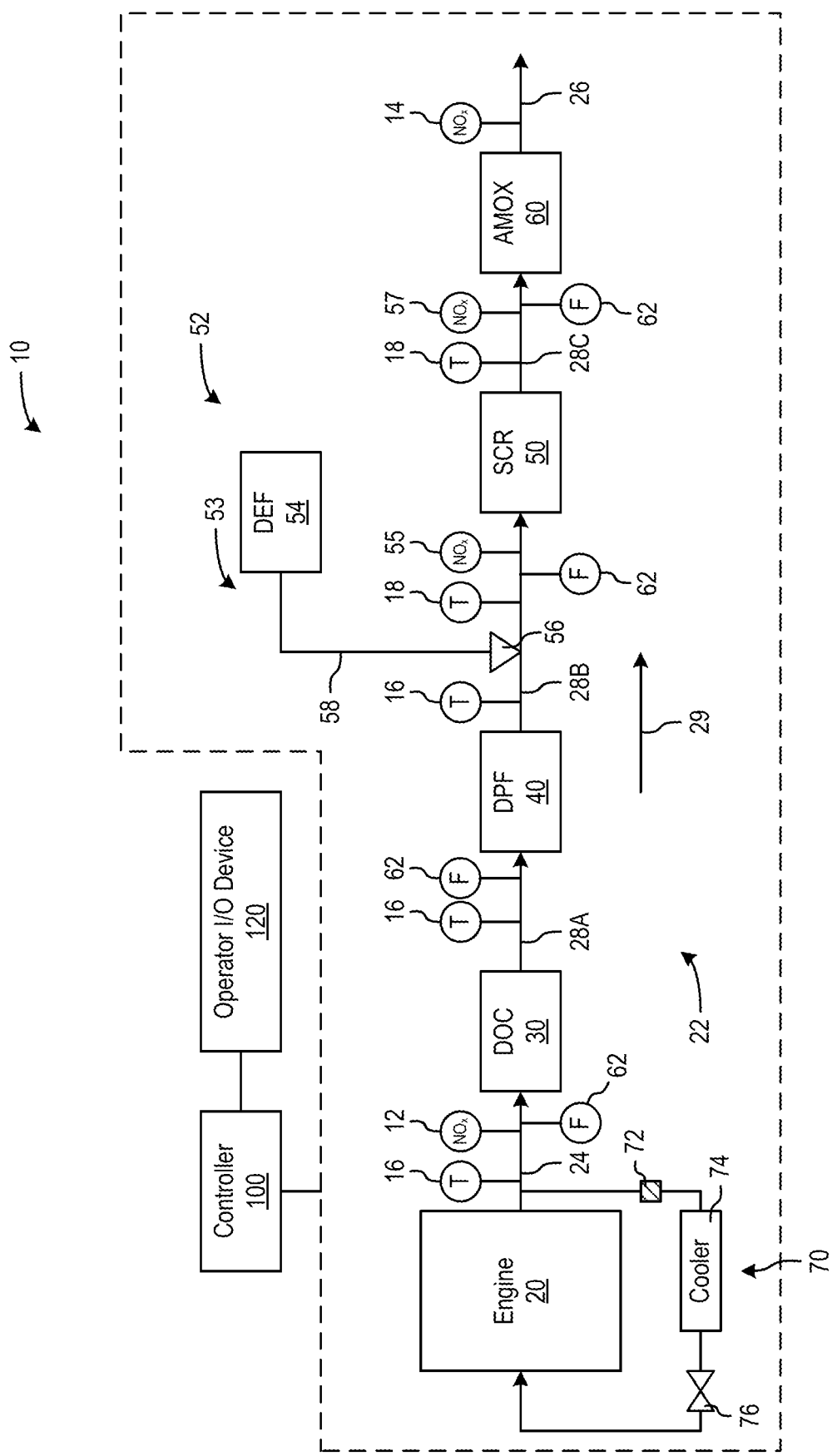
FIG. 1A is a schematic diagram of an engine system.

It will be recognized that some or all of the figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for determining an efficiency value associated with a catalyst member. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust (e.g., sometimes referred to as exhaust gas). Depending on the fuel consumed by an internal combustion engine, the exhaust can contain different byproducts (e.g., $NO_x$, carbon monoxide (CO), unburned hydrocarbons (HC), etc.). The byproduct of the exhaust can be measured or sensed by one or more sensors of the aftertreatment system, for instance, measuring the density, volume, parts per million (ppm), etc. of the exhaust. The aftertreatment system may be coupled to the engine, such as connected via an exhaust pipe from the engine. For simplicity, the examples herein can provide $NO_x$ as the byproducts of the exhaust and the sensor can be a $NO_x$ sensor structured to sense $NO_x$ emission downstream of the engine (e.g., at any position along the exhaust pipe). Although the described examples include a $NO_x$ sensor measuring a $NO_x$ byproduct, the described systems can be applied to other sensors.

The byproducts of the exhaust can be reduced by one or more components of an engine system, such as a DOC member or a SCR catalyst member, among other types of catalyst. For example, the exhaust can flow or traverses through the aftertreatment system. The catalyst member (e.g., SCR catalyst member, DOC member, etc.) can facilitate chemical reactions of the byproducts and reductant to reduce or minimize emissions from a tailpipe of the engine system. For simplicity, the examples herein can provide the SCR catalyst member or the DOC member as the catalyst member of the aftertreatment system to analyze, monitor, or prognosticate, although other types of catalyst members may be monitored, using similar features, functionalities, or operations discussed herein. However, due to the degradation of, or damage to, the catalyst member over time, the efficiency or performance of the catalyst member may be reduced (e.g., the byproduct of the exhaust may not be minimized). Further, some catalyst members may be configured or associated with a standard table (e.g., a single table) of values for a degreened (e.g., new) part indicating predefined expected efficiency values over time (e.g., a timeline of remaining operation time or efficiency curve). This standard table may include values, curves, or data points generated for certain models, types, or manufacturers of the catalyst member to indicate, for instance, the remaining useful life of a catalyst member from new to failure. However, catalyst members from different vehicles may not be utilized in the same manner based on the usage by the operator, geographical location, environmental exposure, among other factors. As such, a standard table having the predefined expected efficiency values may result in an inaccurate expected time to failure or remaining useful life of the catalyst member, including frequent maintenance or delayed replacement of the catalyst member. Therefore, it is desirable to monitor the changes in the degradation of the catalyst member over time and predict the catalyst member health according to the changes. It is also desirable to subsequently inform the operator (e.g., or service technician) with accurate prediction of when to perform maintenance or replacement of the catalyst member prior to failure (e.g., predict a duration until failure).

The systems and methods described herein include at least one controller (e.g., computing device or data processing system) including at least one processor coupled to at least one memory. In some cases, the controller can be embedded into a system including the internal combustion engine, the one or more sensors, and the aftertreatment system. In some cases, the controller may be external to the system, such as a server or a cloud-computing device in communication with one or more components of the system. In this case, the controller is configured to receive data from the system, such as sensor data from the sensors monitoring the internal combustion engine or the aftertreatment system.

The controller can utilize at least one model to determine the cumulative damage value representing or indicative of the cumulative damage to the catalyst member. For example, the controller can input sensor data, such as temperature, exhaust flow rate (e.g., the flow rate of exhaust), etc., into the model (e.g., cumulative damage model) to determine a value indicative of the degradation value (e.g., sometimes referred to as damage value) of the catalyst member. Based on the degradation value, the controller interpolates between one or more metrics (e.g., calibration metrics or tables), represented by respective degradation values. The controller selects at least one of the metrics based on the determined degradation value. Hence, using the selected metric, the controller determines the efficiency value (e.g., first efficiency value, expected performance value, or predicted efficiency value) associated with the catalyst member. The degradation value and the efficiency value change over time depending on the degradation of the catalyst member.

The controller is configured to compare the predicted efficiency value to an actual efficiency value (e.g., second efficiency value or thermal efficiency value) of the catalyst member. To determine the actual efficiency value, such as a measure of heat generated per fuel dosed, the controller determines at least one of exhaust flow rate, HC injection rate (e.g., estimated by the controller), lower heating value of the fuel, or catalyst member in (e.g., upstream) or out (e.g., downstream) temperature, for example. The controller can receive the measurements via signaling from one or more sensors or determine (e.g., estimate) one or more values based on the sensor data. By aggregating the one or more measurements discussed herein, the controller determines the actual efficiency value of the catalyst member. The controller determines a normalized efficiency value based on the predicted efficiency value and the actual efficiency value (e.g., dividing the actual efficiency value by the predicted efficiency value) to determine evidence of degradation by comparing the normalized efficiency value to various thresholds. Hence, when the evidence of degradation is determined, the controller can notify or flag the operator of the expected failure time or remaining useful life of the catalyst member. Accordingly, by determining the normalized efficiency value based on predicted and actual efficiency values, and monitoring the trend of the normalized efficiency values of the catalyst member over time, the accuracy of predicting the remaining useful life or time to failure of the catalyst member can be improved, maintenance frequency may be reduced (e.g., reduce time consumption for the operator), the longevity of the catalyst member may be extended (e.g., prediction of early failure time), and exhaust emission can be minimized by preventing the failure of the catalyst member.

Through these features, implementations described herein are capable of alerting a user as to the use of impure fuel and also alerting a user as to the aging of a catalyst member beyond a desirable amount. As a result, implementations described herein are capable of reducing costs associated with warranty servicing and/or replacements which may be performed when impure fuel is consumed by an engine system.

II. Overview of Catalyst Member Engine System

Referring to the Figures generally, the various embodiments disclosed herein relate to systems, apparatuses, and methods for aftertreatment catalyst member state of health monitor and prognostics. Components in aftertreatment systems to reduce byproducts (e.g., $NO_x$, soot, etc.) of the exhaust include an SCR system that utilizes a two-step process to reduce harmful $NO_x$ emissions present in exhaust or a DOC member to filter or oxidize hydrocarbon, carbon monoxide, or unburned fuel and oil. Referring to the SCR, first, a doser injects a reductant into the exhaust stream. This reductant may be a urea, diesel exhaust fluid (DEF), Adblue®, a urea water solution (UWS), an aqueous urea solution (e.g., AUS32, etc.), or another similar fluid. The reductant may decompose to ammonia (NH3) post-injection. Then, this mixture is run through an SCR catalyst member that, when at a certain temperature, causes a reaction in the mixture that converts the harmful $NO_x$ particles into pure nitrogen and water. In operation, non-decomposed reductant and non-reacted ammonia may be stored within the catalyst member (e.g., SCR catalyst member) to be chemically reacted with the exhaust product (e.g., $NO_x$ particles, etc.).

Further, referring to the DOC member, the exhaust flows through the DOC member, and at least a portion of the byproduct of the exhaust can be oxidized or filtered accordingly. Over time, the performance or efficiency of the DOC member is reduced due to degradation, causing a relatively lower oxidization rate of the byproduct compared to a new DOC member or non-degraded DOC member, for example. Hence, the DOC member may be replaced (e.g., based on irreversible degradation) or cleaned (e.g., based on reversible degradation) depending on its efficiency. The systems and methods discussed herein can perform features and operations to determine evidence of degradation and remaining useful life of the catalyst member to inform the operator of when to replace or clean the catalyst member, for example.

Referring now to FIG. 1A, a schematic diagram of an engine system with a controller 100 is shown, according to an example embodiment. The engine system 10 includes an internal combustion engine 20 coupled to an exhaust aftertreatment system 22 that is in exhaust-receiving communication with the internal combustion engine 20. The engine system 10 also includes a controller 100 is coupled to the system along with an operator input/output (I/O) device 120. In some cases, the controller 100 and/or the I/O device 120 may be remote from and configured to communicate with one or more components of the system 10. The system 10 may be embodied in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle. The vehicle may include a transmission, a fueling system, one or more additional vehicle subsystems, etc. In this regard, the vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

In the example shown, the engine 20 is an internal combustion engine that is structured as a compression-ignition internal combustion engine that utilizes diesel fuel. In various other embodiments, the engine 20 may be structured as any other type of engine (e.g., spark-ignition) that utilizes any type of fuel (e.g., gasoline, natural gas, etc.). In some embodiments, the vehicle may be another type of vehicle, such as a hybrid vehicle containing one or more electric motors, a fuel cell vehicle, and so on. Thus, while the engine 20 is structured as a diesel-powered internal combustion engine herein, other embodiments are contemplated to fall within the scope of the present disclosure.

Within the internal combustion engine 20, air from the atmosphere is combined with fuel and combusted to power the engine. Combustion of the fuel and air in the compression chambers of the engine 20 produces exhaust that is operatively vented to an exhaust manifold (not shown) and to the aftertreatment system 22.

The exhaust aftertreatment system 22 includes a DOC member 30, a DPF member 40, a SCR catalyst member 50 (e.g., part of the an SCR system 52), an AMOx catalyst member 60, and an exhaust recirculation (EGR) system 70. The SCR system 52 further includes a reductant delivery system that has a DEF source 54 that supplies DEF to a DEF doser 56 via a DEF line 58. The DEF source 54 can include a pump and a tank (not shown), configured to be operated by, for instance, the controller 100.

In an exhaust flow direction, as indicated by directional arrow 29, exhaust flows from the engine 20 into outlet piping 24 (e.g., exhaust conduit upstream of the DOC member 30, exhaust manifold, etc.) of the exhaust aftertreatment system 22. From the outlet piping 24, the exhaust flows into the DOC member 30 and exits the DOC member into a first section of exhaust piping 28A (e.g., exhaust conduit downstream of the DOC member 30 or exhaust conduit upstream of the DPF member 40). From the first section of exhaust piping 28A, the exhaust flows into the DPF member 40 and exits the DPF member into a second section of exhaust piping 28B (e.g., exhaust conduit downstream of the DPF member 40 or exhaust conduit upstream of the SCR catalyst member 50). From the second section of exhaust piping 28B, the exhaust flows into the SCR catalyst member 50 and exits the SCR catalyst member into the third section of exhaust piping 28C (e.g., exhaust conduit downstream of the SCR catalyst member 50 or exhaust conduit upstream of the AMOx catalyst member 60). As the exhaust flows through the second section of exhaust piping 28B, it is periodically dosed with DEF (reductant) by the DEF (or reductant) doser 56. Accordingly, the second section of exhaust piping 28B acts as a decomposition chamber or tube to facilitate the decomposition of the DEF to ammonia. From the third section of exhaust piping 28C, the exhaust flows into the AMOx catalyst member 60 and exits the AMOx catalyst member into tailpipe piping 26 (e.g., exhaust conduit downstream of the AMOx catalyst member 60) before the exhaust is expelled from the system 22. Based on the foregoing, in the illustrated embodiment, the DOC member 30 is positioned upstream of the DPF member 40 and the SCR catalyst member 50, and the SCR catalyst member 50 is positioned downstream of the DPF member 40 and upstream of the AMOx catalyst member 60. However, in alternative embodiments, other arrangements of the components of the exhaust aftertreatment system 22 are also possible.

The DOC member 30 may be structured to have any number of different types of flow-through designs. The DOC member 30 may be structured to oxidize at least some particulate matter in the exhaust (e.g., the soluble organic fraction of soot) and reduce unburned hydrocarbons and CO in the exhaust to less environmentally harmful compounds. For example, the DOC member 30 may be structured to reduce the hydrocarbon and CO concentrations in the exhaust to meet the requisite emissions standards for those components of the exhaust. An indirect consequence of the oxidation capabilities of the DOC member 30 is the ability of the DOC member to oxidize NO into $NO_2$. In this manner, the level of $NO_2$ exiting the DOC member 30 is equal to the $NO_2$ in the exhaust generated by the engine 20 in addition to the $NO_2$ converted from NO by the DOC member.

In addition to treating the hydrocarbon and CO concentrations in the exhaust, the DOC member 30 may also be used in the controlled regeneration of the DPF member 40, SCR catalyst member 50, and AMOx catalyst member 60. This can be accomplished through the injection, or dosing, of unburned HC into the exhaust upstream of the DOC member 30. Upon contact with the DOC member 30, the unburned HC undergoes an exothermic oxidation reaction which leads to an increase in the temperature of the exhaust exiting the DOC member 30 and subsequently entering the DPF member 40, SCR catalyst member 50, and/or the AMOx catalyst member 60. The amount of unburned HC added to the exhaust is selected to achieve the desired temperature increase or target controlled regeneration temperature.

The DPF member 40 may be any of various flow-through designs, and is structured to reduce particulate matter concentrations (e.g., soot and ash) in the exhaust to meet requisite emission standards. The DPF member 40 captures particulate matter and other constituents, and thus can be periodically regenerated to burn off the captured constituents. Additionally, the DPF member 40 may be structured to oxidize NO to form $NO_2$ independent of the DOC member 30.

As discussed above, the SCR system 52 includes a reductant delivery system 53. The reductant delivery system 53 includes a reductant (e.g., DEF) source 54, pump (not shown), and a doser 56 (e.g., sometimes referred to as delivery mechanism 56). The reductant source 54 can be a container or tank capable of retaining a reductant, such as, for example, ammonia ($NH_3$), DEF (e.g., urea), diesel oil, etc. The reductant source 54 is in reductant supplying communication with the pump, which is structured to pump reductant from the reductant source 54 to the delivery mechanism 56 via a reductant delivery line 58. The delivery mechanism 56 is positioned upstream of the SCR catalyst member 50. The delivery mechanism 56 is selectively controllable to inject reductant directly into the exhaust stream prior to entering the SCR catalyst member 50. As described herein, the controller 100 is structured to control a timing and amount of the reductant delivered to the exhaust. The reductant may decompose to produce ammonia. As briefly described above, the ammonia reacts with $NO_x$ in the presence of the SCR catalyst member 50 to reduce the $NO_x$ to less harmful emissions, such as $N_2$ and $H_2O$. The $NO_x$ in the exhaust stream includes $NO_2$ and NO. Both $NO_2$ and NO are reduced to $N_2$ and $H_2O$ through various chemical reactions driven by the catalytic elements of the SCR catalyst member in the presence of $NH_3$.

In some implementations, the SCR catalyst member 50 is a vanadium-based catalyst member, and in other implementations, the SCR catalyst member is a zeolite-based catalyst member, such as a copper-zeolite (Cu-Ze) or an iron-zeolite (Fe-Zu) catalyst member. In one representative embodiment, the reductant is aqueous urea and the SCR catalyst member 50 is a zeolite-based catalyst member. In other embodiments, the reductant includes a first reductant and a second reductant, wherein the first reductant is urea and the second reductant is ammonia.

The AMOx catalyst member 60 may be any of various flow-through catalyst members structured to react with ammonia to produce mainly nitrogen. As briefly described above, the AMOx catalyst member 60 is structured to remove ammonia that has slipped through or exited the SCR catalyst member 50 without reacting with $NO_x$ in the exhaust. In certain instances, the aftertreatment system 22 can be operable with or without an AMOx catalyst member. Further, although the AMOx catalyst member 60 is shown as a separate unit from the SCR system 52 in FIG. 1A, in some implementations, the AMOx catalyst member may be integrated with the SCR catalyst member (e.g., the AMOx catalyst member and the SCR catalyst member can be located within the same housing). As referred to herein, the SCR catalyst member 50 and AMOx catalyst member 60 form the SCR and AMOx system. Accordingly, health or degradations determined are in regard to those catalyst members.

For simplicity, and for purposes of examples herein, the DOC member 30 can be provided as the catalyst member to monitor and analyze for prognosticating the health or condition of the catalyst member. Prognosticating the health of the catalyst member may refer to predicting or determining the health of the catalyst member at a subsequent time, such as failure time or remaining useful life of the catalyst member. However, the features, operations, and processes discussed herein for DOC member 30 monitoring and prognostics can be performed similarly for other components or catalyst members of the aftertreatment system 22, such as the DPF member 40, SCR catalyst member 50, or the AMOx catalyst member 60.

The system 10 (e.g., the aftertreatment system 22) includes various sensors. For example, the aftertreatment system 22 includes $NO_x$ sensors 12, 14, 55, 57. The aftertreatment system 22 includes temperature sensors 16, 18. The aftertreatment system 22 includes flow sensors 62. The sensors can be strategically disposed throughout the aftertreatment system 22, such as upstream, at, or downstream from one or more catalysts (e.g., DOC 30, DPF 40, SCR catalyst 50, and/or AMOx catalyst 60). The sensors can be in communication with the controller 100 and configured to monitor operating conditions of the system 10. It should be understood that one or more flow, pressure, and a variety of other sensors (oxygen sensors, exhaust constituent sensors, NH3 sensors) may also be included in the system and disposed in a variety of locations. As shown, more than one $NO_x$ sensor may be positioned upstream and downstream of the catalyst member(s). In this configuration, the $NO_x$ sensor 12 measures the engine out $NO_x$ while $NO_x$ sensor 55 measures the SCR catalyst member 50 inlet $NO_x$ amount. This is due to DOC member 30/DPF member 40 potentially oxidizing some portion of the engine out $NO_x$ whereby the engine out $NO_x$ amount would not be equal to the SCR catalyst member 50 inlet $NO_x$ amount. Accordingly, this configuration accounts for this potential discrepancy. The $NO_x$ amount leaving the SCR catalyst member 50 may be measured by $NO_x$ sensor 57 and/or $NO_x$ sensor 14. In some embodiments, there may be only one such sensor, such as either one of either $NO_x$ sensor 57 or $NO_x$ sensor 14. The $NO_x$ sensor 57 (in some embodiments, $NO_x$ sensor 14) is positioned downstream of the SCR catalyst member 50 and structured to detect the concentration of $NO_x$ in the exhaust downstream of the SCR catalyst member (e.g., exiting the SCR catalyst member).

The temperature sensors 16 are associated with the DOC member 30 and DPF member 40, and thus can be defined as DOC member/DPF member temperature sensors 16. The DOC member/DPF member temperature sensors are strategically positioned to detect the temperature of exhaust flowing into the DOC member 30 (e.g., the temperature of the exhaust conduit upstream from the catalyst member), out of the DOC member 30 (e.g., the temperature of the exhaust conduit downstream from the catalyst member) and into the DPF member 40, and out of the DPF member before being dosed with DEF by the doser 56. In some implementations, at least one temperature sensor 16, 18 may be configured as part of the catalyst member itself, thereby directly measuring a bed temperature of the catalyst member.

The flow sensors 62 are associated with one or more catalyst members, such as DOC member 30, DPF member 40, SCR catalyst member 50, or AMOx catalyst member 60, and thus can be defined as DOC member/DPF member/SCR catalyst member/AMOx catalyst member flow rate sensor 62. The flow rate sensors 62 are strategically positioned to detect the flow rate of exhaust from the engine 20, such as flowing into the DOC member 30, out of the DOC member 30 and into the DPF member 40, and out of the DPF member 40 and into the SCR 50, etc. In some cases, at least one flow sensor 62 may be implemented a part of the catalyst member itself, and hence the flow rate within the catalyst member can be measured directly. In some other cases, one or more sensors discussed herein may include virtual sensors executing on the controller 100. For example, to compute the temperature of the DOC member 30, the controller 100 may execute a virtual sensor to compute an average between the temperature upstream and temperature downstream from the DOC member 30. In another example, the controller 100 can determine the flow rate across the DOC member 30 by computing the average between a flow rate upstream from and another flow rate downstream from the DOC member 30 (e.g., in a virtual sensor arrangement). Similar procedures or processes can be performed for other components of the aftertreatment system 22.

The EGR system 70 is structured to recirculate exhaust back to an intake manifold of the engine 20 to be used for combustion. The EGR system 70 includes an EGR cooler 74 and an EGR valve 76. The EGR cooler 74 may be, for example, air-to-air and/or liquid (e.g., coolant)-to-air (e.g., exhaust) heat exchangers, in some applications. The EGR cooler 74 is structured to remove heat from the exhaust prior to the exhaust being re-introduced into the intake manifold. Heat is removed from the exhaust prior to reintroduction to, among other reasons, prevent high intake temperatures that could promote pre-ignition (e.g., engine knock).

Although the exhaust aftertreatment system 22 shown includes the DOC member 30, the DPF member 40, the SCR catalyst member 50, and the AMOx catalyst member 60 positioned in specific locations relative to each other along the exhaust flow path, in other embodiments the exhaust aftertreatment system may include more than one of any of the DOC member 30, DPF member 40, SCR catalyst member 50, and AMOx catalyst member 60 positioned in any of various positions relative to each other along the exhaust flow path.

FIG. 1A is also shown to include an operator input/output (I/O) device 120. The operator I/O device 120 is communicably coupled to the controller 100, such that information may be exchanged between the controller 100 and the I/O device 120. The information exchanged between the controller 100 and the I/O device 120 may relate to one or more components of FIG. 1A or any of the determinations of the controller 100 disclosed herein. The operator I/O device 120 enables an operator (e.g., occupant, etc.) of the vehicle to communicate with the controller 100 and other components of the vehicle, such as those illustrated in FIG. 1A. For example, the operator I/O device 120 may include an interactive display, a touchscreen device, one or more buttons and switches, voice command receivers, etc. In some cases, the I/O device 120 may be a part of a vehicle including the engine 20 and the aftertreatment system 22. In some other cases, the I/O device 120 may be a remote device accessible by the operator, such as via a client device. In some aspects, the I/O device 120 may be a server receiving data from the controller 100 of the vehicle.

The controller 100 is structured to control, at least partly, operation of the system 10 and associated sub-systems, such as the internal combustion engine 20 and the exhaust aftertreatment system 22. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, Bluetooth, etc. In one embodiment, a controller area network ("CAN") bus provides the exchange of signals, information, and/or data. The CAN bus includes any number of wired and wireless connections. Because the controller 100 is communicably coupled to the systems and components of FIG. 1A, the controller 100 is configured to receive data from one or more of the components shown in FIG. 1A. For example, the data may include $NO_x$ data (e.g., an incoming $NO_x$ amount from $NO_x$ sensor 55 and an outgoing $NO_x$ amount from $NO_x$ sensor 57), dosing data (e.g., timing and amount of dosing delivered from doser 56), and vehicle operating data (e.g., engine speed, vehicle speed, engine temperature, flow rate, etc.) received via one or more sensors. As another example, the data may include an input from operator input/output device 120. As described more fully herein, using this data, the controller 100 monitors and prognosticates the health of the catalyst member (e.g., DOC member 30, among others), such as degradation, remaining useful life, or time to failure of the catalyst member. The structure, function, or configuration of the controller 100 are further described in regard to FIG. 1B.

Figure 1B:
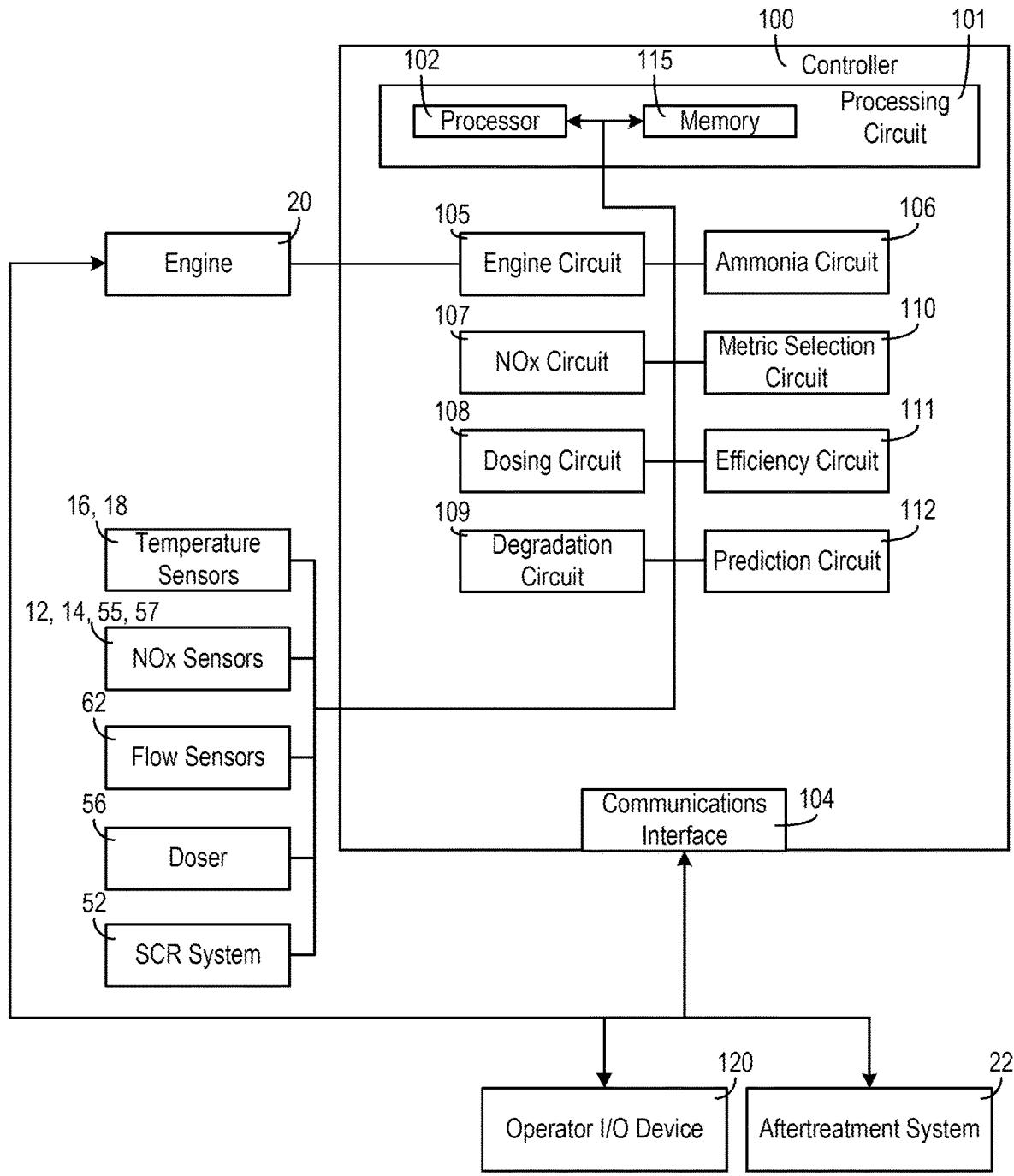
FIG. 1B is another schematic diagram of the engine system of FIG. 1A.

FIG. 1B shows an example structure for the controller 100 includes a processing circuit 101 including a processor 102, a memory 115, and various circuits including at least an engine circuit 105, ammonia circuit 106, $NO_x$ circuit 107, dosing circuit 108, degradation circuit 109, metric selection circuit 110, efficiency circuit 111, and prediction circuit 112. The processor 102 may be implemented as a processor, an application specific integrated circuit (ASIC), one or more field programmable gate arrays (FPGAs), a digital signal processor (DSP), a group of processing components, or other suitable electronic processing components. The memory 115 (e.g., RAM, ROM, Flash Memory, hard disk storage, etc.) may store data and/or computer code for facilitating the various processes described herein. The memory 115 may be communicably connected to the processor 102 and one or more circuits. In various embodiments, the memory 115 includes an engine circuit 105, an ammonia circuit 106, a $NO_x$ circuit 107, a dosing circuit 108, a degradation circuit 109, a metric selection circuit 110, an efficiency circuit 111, and a prediction circuit 112. The memory 115 is and configured to provide computer code or instructions to the processor 102 for executing the processes described in regard to the controller 100 herein. Moreover, the memory 115 may be or include tangible, non-transient volatile memory or non-volatile memory. Accordingly, the memory 115 may include database components, object code components, script components, or any other type of information structure for supporting the various activities and information structures described herein.

The controller 100 is structured to receive inputs (e.g., signals, information, data, etc.) from the system 10 components/systems and/or operator I/O device 120. Thus, the controller 100 is structured to control, at least partly, the system 10 components/systems and associated engine 20. As the components of FIG. 1B can be embodied in a vehicle, the controller 100 may be configured as one or more electronic control units (ECU). The controller 100 may be separate from or included with at least one of a transmission control unit, an exhaust aftertreatment control unit, a powertrain control module, an engine control module, etc. In some cases, the controller 100 may be a device remote from the vehicle, such as a remote controller configured to control or communicate with one or more components of the system 10.

In one configuration, one or more of the engine circuit 105, the ammonia circuit 106, the $NO_x$ circuit 107, the dosing circuit 108, the degradation circuit 109, the metric selection circuit 110, the efficiency circuit 111, or the prediction circuit 112 can be embodied as machine or computer-readable media that stores instructions that are executable by a processor, such as the processor 102, and stored in a memory device, such as the memory 115. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the one or more circuits are embodied as hardware units, such as electronic control units. As such, the one or more may be embodied as one or more circuitry components including, but not limited to, processing circuitry, network interfaces, peripheral devices, input devices, output devices, sensors, etc. In some embodiments, the one or more circuits may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the one or more circuits may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The one or more circuits may also include programmable hardware devices such as field programmable gate arrays, programmable array logic, programmable logic devices or the like. The one or more circuits may include one or more memory devices for storing instructions that are executable by the processor(s) of the individual circuits (e.g., engine circuit 105, ammonia circuit 106, $NO_x$ circuit 107, dosing circuit 108, degradation circuit 109, metric selection circuit 110, efficiency circuit 111, and prediction circuit 112). The one or more memory devices and processor(s) may have the same definition as provided below with respect to the memory 115 and processor 102. In some hardware unit configurations, the one or more circuits may be geographically dispersed throughout separate locations in, for example, a vehicle. Alternatively and as shown, the one or more circuits may be embodied in or within a single unit/housing, which is shown as the controller 100.

In the example shown, the controller 100 includes the processing circuit 101 having the engine circuit 105, ammonia circuit 106, $NO_x$ circuit 107, dosing circuit 108, degradation circuit 109, metric selection circuit 110, efficiency circuit 111, prediction circuit 112. The processing circuit 101 may be structured or configured to execute or implement the instructions, commands, and/or control processes described herein with respect to the one or more circuits. The depicted configuration represents the engine circuit 105, the ammonia circuit 106, the $NO_x$ circuit 107, the dosing circuit 108, the degradation circuit 109, the metric selection circuit 110, the efficiency circuit 111, and the prediction circuit 112 as instructions in machine or computer-readable media. In some embodiments, the instructions may be stored by the memory device. However, as mentioned above, this illustration is not meant to be limiting as the present disclosure contemplates other embodiments where the engine circuit 105, the ammonia circuit 106, the $NO_x$ circuit 107, the dosing circuit 108, the degradation circuit 109, the efficiency circuit 111, and the prediction circuit 112, or at least one of the one or more circuits, is configured as a hardware unit. All such combinations and variations are intended to fall within the scope of the present disclosure.

In the example shown, the controller 100 includes at least an engine circuit 105 structured to control the engine 20, a $NO_x$ circuit 107 in communication with the $NO_x$ sensors 12, 14, 55, 57, an ammonia circuit 106 in communication with sensors associated with the SCR catalyst member 50 and/or the AMOx catalyst member 60, a dosing circuit 108 structured to control operation of a pump, etc., in connection with the DEF source 54, a degradation circuit 109 in communication with other circuits and configured to determine the degradation value associated with the catalyst member (e.g., the DOC member 30, etc.), a metric selection circuit 110 in communication with other circuits and configured to select at least one metric from the one or more metrics (e.g., calibration metrics) stored in the memory 115 (or stored remotely in the cloud), an efficiency circuit 111 in communication with other circuits and configured to determine the efficiency value (e.g., performance value) associated with the catalyst member, and a prediction circuit 112 in communication with other circuits and configured to determine or predict an exhibited useful life or remaining operating time of the catalyst member or determine whether at least a portion of the degradation is reversible or not reversible.

The engine circuit 105 is structured to receive information from a user or an operator (e.g., via the operator input/output device 120) and to provide instructions to or otherwise control the engine 20. For instance, the engine circuit 105 can control the operations or components of the engine including at least the intake valve for controlling intake air or gas, the exhaust valve to release the exhaust through the pipe (e.g., piping 24, 28A-C, 26, etc.), or other components of the engine 20. Thus, the engine circuit 105 may control a torque and/or speed of the engine 20. The engine circuit 105 is structured to receive information associated with the engine 20, such as a fueling amount, a temperature, etc. The engine circuit 105 is structured to communicate the engine information to one or more other circuits (e.g., degradation circuit 109, metric selection circuit 110, efficiency circuit 111, prediction circuit 112, etc.) of the controller 100 and to components of the memory 115.

The ammonia circuit 106 is configured to communicate with the dosing circuit 108, the temperature sensors 16, 18, and the $NO_x$ sensors 12, 14, 55, 57 to determine the amount of ammonia stored in the SCR catalyst member 50, for example.

The $NO_x$ circuit 107 is coupled to and communicates with the $NO_x$ sensors 12, 14, 55, 57 and provide information regarding $NO_x$ levels to other circuits of the controller 100 and to components of the memory 115. The one or more $NO_x$ sensor(s) may be virtual $NO_x$ sensor(s) or physical $NO_x$ sensor(s). The $NO_x$ circuit 107 may process raw data received from the $NO_x$ sensors 12, 14, 55, 57 in addition to other sensor data to provide information indicative of a $NO_x$ level to other circuits of the controller 100 and to components of the memory 115.

The dosing circuit 108 is structured to provide a dosing command to the doser 56 to control and manage (e.g., adjust) an ammonia dosing amount and/or timing from the doser 56. As such, the dosing command may be provided to a doser, such as doser 56. The dosing circuit 108 may also communicate with the ammonia circuit 106 and the $NO_x$ circuit 107. For example, the dosing circuit 108 can receive information from the ammonia circuit 106 indicating an ammonia storage level of the SCR catalyst member 50. Based on a determination that the ammonia storage level is below a threshold, the dosing circuit 108 may increase a dosage amount or rate.

The degradation circuit 109 is configured to determine the degradation value associated with the catalyst member (e.g., the DOC member 30, etc.). The degradation circuit 109 is configured to utilize at least one model (e.g., cumulative damage model) to determine a value representing the degradation of the catalyst member, such as the extent the catalyst member has degraded. The model can be based on a physical model of catalyst member degradation. The model is catalyst member formulation specific, where any changes to the formulation (e.g., platinum group metal (PGM) loading, PGM ratio, zone length, etc.) of the catalyst member change the output value from the model. In some cases, the dimension or size of the catalyst member may not change (e.g., affect) the output value of the model.

For example, the model can be trained by the controller 100 or other data processing devices using data accumulated from the system 10 or other systems having comparable catalyst members (e.g., similar make, model, or type). The cumulative damage model can be a single model or a combination of multiple models (e.g., individual models configured to perform respective features to estimate or determine the degradation of the catalyst member corresponding to physical or chemical parameters). For example, the model may include or correspond to a short-term cumulative degradation model (e.g., short-term model) or a long-term cumulative degradation model (e.g., long-term model).

The short-term model can be configured to estimate or determine the degradation corresponding to the amount of sulfur and hydrocarbons, among other byproducts stored or formed in the catalyst member over a period of time. The model can be trained using data associated with other comparable catalyst members (e.g., similar types, make, or model). For example, the model can be trained using historical operation data (e.g., historical sensor data) from one or more sensors of systems including comparable catalyst members, such as sensors configured to sense byproducts (e.g., $NO_x$ sensor, etc.) in and out of the catalyst member. The sensor data can indicate the amount of byproduct filtered, stored, formed, or captured by the catalyst member based on the difference between the amount of byproducts upstream and downstream from the catalyst member. The model can be trained using flow sensor data from other systems having comparable catalyst members, such as to determine the byproduct stored or formed in the catalyst member based on the difference in pressure or flow rate upstream and downstream from the catalyst member. For instance, the flow rate upstream from the catalyst member may be less than the flow rate downstream from the catalyst member. With a greater build-up of the byproduct stored or formed in the catalyst member (e.g., compared to new or cleaned catalyst member), the difference between the upstream flow rate and the downstream flow rate from the catalyst member is increased. With a minimal (e.g., less) build-up of the byproduct, the difference of the flow rate upstream and downstream from the catalyst member may be comparatively less than with the greater amount of build-up of the byproduct.

The long-term model can be configured to estimate or determine a degradation corresponding to the thermal aging of the catalyst member over a period of time. Thermal aging may refer to or include damages to the catalyst member caused by thermal exposures. The model can be trained using data associated with other comparable catalyst members (e.g., similar types, make, or model). For example, based on collected historical data including at least one of temperature data or performance data (e.g., based on the performance of filtering the byproduct), the model determines the impact of thermal exposure on the performance of the catalyst member over time. The model may determine a trend or a correlation between the thermal exposure and the performance of the catalyst member over its operating time.

In some arrangements, the long-term model can correspond to other types of degradation (e.g., in addition to or alternative to thermal aging), such as phosphorous poisoning, among other types of chemical poisoning causing long-term damage to the catalyst member. The model (e.g., short-term model or long-term model) can be adjusted, trained, or calibrated to account for different duty cycles, applications, or environments in which the model is utilized. Based on the applications or environments, the catalyst member experiences more or less degradation or different types of degradation, which can be accounted for by the model.

In various implementations, each sample data used for training the model can be associated with a characteristic of the respective catalyst member. The characteristic of the catalyst member includes at least the specification of the catalyst member indicating the structure, construction, catalyst member substrate, among other information indicative of the formulation of the catalyst member. Hence, when utilizing the model, the degradation circuit 109 may provide the characteristic of the catalyst member as one of the inputs. The model may map or correlate the historical operation data of the catalyst member having the characteristic to the historical data of other catalyst members having similar characteristics, for example.

Accordingly, the degradation circuit 109 can use the model to determine a value representing the degradation of or damage to the catalyst member. For simplicity, the value can range between 0 to 1 (e.g., other ranges may be used including 0 to 10, 0 to 100, etc.), where 1 represents/indicates a new part (e.g., full activity or performance from the catalyst member) and 0 represents a completely degraded part (e.g., no activity or performance from the catalyst member). Hereinafter, the features, operations, or procedures may be performed by the one or more circuits of the controller 100 utilizing one or more other models, such as in addition to the cumulative damage model. The one or more models may be executed continuously, periodically (e.g., hourly, daily, etc.), or initiated according to certain triggers (e.g., at the start of the engine 20, during fuel injection, etc.).

The metric selection circuit 110 can be configured to determine or select at least one of various metrics (e.g., calibration table for predicted efficiency) based on the output value or result of the cumulative damage model. The metrics may be stored in the memory 115 local to the controller 100. The metrics may be stored in a data storage or data repository remote from the controller 100, such as on a cloud storage device. The metric selection circuit 110 is configured to identify the metrics from the memory 115. The metric selection circuit 110 is configured to identify or retrieve one or more metrics from a remote data repository. The metrics can be configured by an administrator or technician. Each metric is associated with a respective degradation value (e.g., reference degradation value), indicating that the metric is to be used for a catalyst member corresponding to a similar degradation value. For instance, based on the configuration by the administrator, a list of metrics may include four metrics, eight metrics, 10 metrics, or any other number of metrics across the degradation value range (e.g., metrics associated with the range of degradation values 0 to 1). For simplicity, and for purposes of examples provided herein, four metrics may be configured, stored, or maintained for selection by the metric selection circuit 110. These four metrics can be associated with reference degradation values of 0.1, 0.4, 0.7, and 1, respectively, for example. Although four metrics are configured for the purposes of providing examples herein, additional metrics may be introduced to increase the resolution in determining the reduction of catalyst member performance as degradation occurs.

The metric selection circuit 110 selects at least one of the metrics from a list of metrics based on the determined degradation value. The metric selection circuit 110 selects the metric associated with a reference degradation value closest to the determined degradation value. For example, the metric selection circuit 110 may receive a determined degradation value of 0.5 from the degradation circuit 109. The metric selection circuit 110 determines the difference between 0.5 and one or more reference degradation values of the metrics. For example, the metric selection circuit 110 compares the degradation value to a first reference degradation value (e.g., next higher/lower number to the degradation value) and a second reference degradation value (e.g., next lower/higher number to the degradation value). In this case, the first reference degradation value is 0.7 and the second reference degradation value is 0.4. Based on these differences, the metric selection circuit 110 selects the metric associated with the second reference degradation value to utilize for determining the efficiency value of the catalyst member.

The metric selection circuit 110 is configured to interpolate between the metrics of predicted efficiencies based on the changes in the damages or degradation of the catalyst member. The metric selection circuit 110 re-selects or maintains the selection of the metric based on the updated output of the cumulative damage model. For example, if the updated degradation value is closer to the reference degradation value (e.g., compared to other reference degradation values) associated with the same metric, the metric selection circuit 110 can maintain the selection of the metric for determining the efficiency of the catalyst member. In another example, if the updated degradation value is closer to a reference degradation value associated with another metric, the metric selection circuit 110 can select the other metric for determining the efficiency of the catalyst member.

The metric selection circuit 110 may select, re-select, or use the metric during, before, or subsequent to a regeneration operation of the catalyst member. For simplicity, the metric selection circuit 110 may use the metric during the regeneration process. Hence, the metric selection circuit 110 can linearly interpolate between the metrics according to the degradation value during a regeneration process. An examples of the metrics may be shown in conjunction with at least FIG. 3.

The efficiency circuit 111 is configured to determine the predicted efficiency of the catalyst member. The predicted efficiency can be represented by values included in the metrics. For simplicity, the values can range from 0 to 1, however, other ranges can be used, such as 0 to 10, 0 to 100, etc. The values can be the percentage or ratio of efficiency, where 1 represents 100% efficiency, 0 represents 0% efficiency, and 0.5 represents 50% efficiency. For example, each of the metrics includes various values (e.g., predicted efficiency values) indicative of the predicted efficiency (e.g., performance) of the catalyst member. The predicted efficiency values are associated with the respective reference degradation value of the metric, and hence are different between the various metrics. The values of the metrics may be predefined, pre-generated, or prepopulated values using a catalyst member physics model. The catalyst member physics model is used to assess the predicted efficiency at a given or predetermined condition (e.g., temperature, flow rate, inlet gas constituents, etc.). The efficiency circuit 111 uses the catalyst member physics model to obtain the predicted efficiency, which can be used, for example, to populate the metrics with respect to the associated values in the metrics (e.g., catalyst member temperature and flow rate). The catalyst member physics model can be trained using observed, measured, or collected sample data from other systems having a comparable catalyst member (e.g., similar composition or structure). The catalyst member physics model can be specific to the formulation of the catalyst member, such as PGM loading, PGM ratio, zone length, among others, where changes to the catalyst member specification (e.g., PGM recipe, formulation, etc.) modifies the output from the catalyst member physics model. Further, updated sample data can change the populated values of one or more metrics.

For example, at least one of the degradation value(s), space velocities, and temperature (e.g., bed temperature), among other data of various catalyst members are collected. Multiple metrics are generated according to the degradation value(s) observed for the respective catalyst member. With each given degradation value, various efficiencies are determined based on the heat generated per fuel dosed (e.g., for DOC member 30) at various space velocities and bed temperatures of the catalyst member. In some cases, the efficiencies are determined based on the amount of byproduct filtered or reduced by the catalyst member (e.g., for DPF member 40 or SCR catalyst member 50). The space velocity is determined based on the exhaust flow rate (e.g., exhaust volumetric flow rate) measured by at least one flow sensor 62 and catalyst member bed volume (e.g., the volume of the catalyst member based on the specification of the catalyst member). In some cases, the exhaust flow rate is determined based on the fresh air flow rate upstream from the engine 20 (e.g., using a flow sensor upstream from the engine 20) and the total fueling (e.g., injection of fuel) within the engine 20. Hence, the space velocity can be computed by dividing the flow rate by the catalyst member bed volume (e.g., space_velocity=(exhaust_volumetric_flow_rate)/(catalyst member_bed_volume)). Based on the efficiencies determined for various space velocities and bed temperatures for the corresponding degradation value, individual metrics can be populated accordingly.

The catalyst member bed temperature can be measured by one or more temperature sensors 16, 18 of the aftertreatment system 22, such as a temperature sensor embedded into or implemented as part of the catalyst member. The catalyst member bed temperature can be measured by a virtual temperature sensor configured for the catalyst member. For example, the virtual sensor output can be based on the upstream temperature and downstream temperature from the catalyst member. In this example, the bed temperature may be an average of the upstream and downstream temperatures. The efficiency circuit 111 uses the selected metric, the space velocity, and the bed temperature to select, determine, or identify an efficiency value associated with the catalyst member.

The efficiency circuit 111 is configured to determine the actual efficiency (e.g., actual thermal efficiency) of the catalyst member. The actual efficiency includes or corresponds to the efficiency of the catalyst member measured by one or more sensors of the system 10. For example, the actual efficiency can be a measure of heat generated per fuel dosed (e.g., for DOC member 30). The efficiency of the catalyst member can be determined based on the following formula (1):

$$HC\ Thermal\ Conv\ Eff = \frac{\dot{m}_{exh}(C_{P_{out}}T_{out} - C_{P_{in}}T_{in})}{\dot{m}_f(LHV)} \quad (1)$$

Where $\dot{m}_{exh}$ = V_ATP_fg_Exhuast_Total;

$\dot{m}_f$ = V_ATM_fg_HC_Fdbk_Total;

$LHV$ = C_OCR_HC_lnj_Fuel_LHV;

$T_{out}$ = V_ATP_trc_DOC_Out;

$T_{in}$ = V_ATP_trc_DOC_In; and $C_p$ = 1.0111 if Exhaust Gas Temp < Threshold Temperature; else $C_p$ = 0.98353 + 0.00021743 × Exh Gas Temp.

As indicated above, $m_{exh}$ is the exhaust mass flow rate. $m_f$ is the mass flow rate of hydrocarbons. LHV refers to the lower heating value of diesel fuel. $T_{out}$ is the outlet temperature of the catalyst. $T_{in}$ is the inlet temperature of the catalyst. $C_p$ is the heat capacity.

The efficiency circuit 111 is configured to use at least the formula above to determine the actual efficiency of the catalyst member. In this case, the efficiency circuit 111 inserts at least one of exhaust flow rate (e.g., measured from at least one of the flow sensors 62) across the catalyst member (e.g., upstream, downstream, or the average of the upstream and downstream flow rates), the hydrocarbon injection rate (e.g., estimated or determined by a hydrocarbon injector (not shown)), a lower heating value of the fuel (e.g., based on the fuel utilized for the engine 20), or the temperature of the catalyst member (e.g., inlet temperature, outlet temperature, or bed temperature of the catalyst member measured by the one or more temperature sensors 16, 18). Accordingly, the efficiency circuit 111 is configured to determine the actual efficiency of the operating catalyst member in the aftertreatment system 22.

The efficiency circuit 111 is configured to determine the normalized efficiency of the catalyst member. The normalized efficiency of the catalyst member indicates the difference between the actual efficiency of the catalyst member compared to the predicted efficiency. The normalized efficiency is based on the predicted efficiency determined using the metric and the actual efficiency determined using formula (1) (or other similar formulas for determining catalyst member efficiency or performance). For example, the efficiency circuit 111 determines the normalized efficiency by dividing the actual efficiency by the predicted efficiency. In some cases, the efficiency circuit 111 determines the normalized efficiency by dividing the predicted efficiency by the actual efficiency. Other aggregation techniques, such as subtraction, addition, etc. can be used to determine the normalized efficiency. For simplicity and purposes of examples, the actual efficiency is divided by the predicted efficiency to determine the normalized efficiency, such that a lower normalized efficiency value represents a lower than expected efficiency, and a higher normalized efficiency value represents a higher than expected efficiency. Hence, the efficiency circuit 111 determines whether the actual efficiency of the catalyst member is approximate to the predicted efficiency (e.g., within expectation).

For instance, if the normalized efficiency value is 1, this indicates that the actual efficiency of the catalyst member matches the prediction. The delta or difference of the normalized efficiency value from 1 indicates unexpected degradation of the catalyst member, which can be used by the prediction circuit 112 to predict or determine the exhibited useful life of the catalyst member, among others. Hence, the efficiency circuit 111 can determine the one or more efficiency values corresponding to the catalyst member for determining any evidence of degradation/damage, or the expected remaining useful life of the catalyst member. By normalizing the efficiency, the efficiency circuit 111 can relate the observed performance (e.g., efficiency) of the catalyst member to a specific amount of degradation.

The prediction circuit 112 is configured to predict or determine at least one of the exhibited useful life, failure time, or remaining operating time of the catalyst member. For example, the prediction circuit 112 performs statistical analysis (e.g., using thresholds for control limits) on the normalized efficiency values (e.g., trending of the normalized efficiency values over time) corresponding to the catalyst member. The prediction circuit 112 determines whether the trend or changes in the normalized efficiency values is within expectation (e.g., within a threshold rate of change or drop in efficiency). For example, the normalized efficiency values may remain within an upper and lower control limit for the lifetime of the part or fall below the lower control limit. In some cases, short deviations of the normalized efficiency values below the lower control limit may indicate a reversible type of degradation, whereas continuous or average operation below the lower control limit may indicate irreversible degradation. Certain applications or duty cycles utilizing the catalyst member may experience faster (e.g., rapid) or more severe degradation, such as compared to other types of applications, duty cycles, or environments. In various implementations, statistical tests can be performed (e.g., a two-sample T-test) to identify the impact of the different applications or duty cycles to the degradation of the part. Such analysis or tests can improve the design or operating conditions of the models discussed herein or data processing by the controller 100, among other data processing system.

Examples of the trend in normalized efficiency values may be shown in conjunction with at least FIGS. 4A-B. If the trend of the normalized efficiency value is around 1 or the trend is relatively constant or flat (e.g., actual efficiency is similar to the predicted efficiency according to the degradation value), the prediction circuit 112 determines that the catalyst member is aging as expected (e.g., within expectation). The threshold for the drop rate or rate of change in the trending normalized efficiency values over time may be configured or updated by the administrator based on normalized efficiency values monitored from other systems having comparable catalyst members, for example. For example, a step change in the normalized efficiency values of 0.5 may signify an event, such as an (e.g., massive) upstream engine failure, that has occurred to shift the performance. A slower drop rate of the normalized efficiency values (e.g., slower drop rate in performance) may represent a less severe degradation (e.g., oil exposure due to worn cylinder rings). Historical information or test data, such as (e.g., historical) operation data, may be used to determine or estimate the associated drop rate in performance expected from certain types of degradation.

The prediction circuit 112 determines whether there is evidence of degradation (e.g., unexpected degradation) based on the trend of the normalized efficiency values over time. If the monitored normalized efficiency values trend downward or upward greater than or equal to the threshold rate of change, the prediction circuit 112 determines that there is evidence of degradation of the catalyst member. Otherwise, if the normalized efficiency values do not trend upward or downward at or above the threshold rate of change, the prediction circuit 112 determines that the catalyst member is healthy (e.g., degrades at an expected rate). Because the catalyst member degrades at an expected rate, the prediction circuit 112 can determine the exhibited useful life of the catalyst member based on the trend in degradation of the catalyst member.

For example, the catalyst member degradation trend may be determined using the cumulative damage model, among other degradation models. The prediction circuit 112 provides historical sensor data, among other data associated with the catalyst member as inputs into the cumulative damage model to determine at least the degradation trend of the catalyst member (e.g., current degradation and past degradation values). With at least the current and past degradation trend, the prediction circuit 112 using the cumulative damage model determines the expected or predicted exhibited useful life of the catalyst member using, for example, a linear regression technique, among others. An example of the catalyst member degradation trend may be shown in conjunction with at least FIGS. 5A-B.

In some implementations, the prediction circuit 112 determines or identifies evidence of (e.g., unexpected) degradation based on the trend of normalized efficiency values. In this case, the prediction circuit 112 may not simply use the catalyst member degradation trend (e.g., determined using the cumulative damage model or the linear regression technique) because the changes in catalyst member efficiency are not within expectation. In various implementations, the prediction circuit 112 may adjust the exhibited useful life (e.g., remaining operating time or failure time) of the catalyst member based on (e.g., proportional to) the trend of changes to the normalized efficiency values. For example, based on a downward trend of efficiency values greater than or equal to a threshold (e.g., lower threshold), the prediction circuit 112 determines that the catalyst member may fail earlier than expected. Therefore, the prediction circuit 112 can reduce the exhibited useful life or remaining operating time of the catalyst member according to (e.g., proportional to) the downward trend. The estimated useful life (EUL) can be adjusted based on one or more factors, such as the degradation value from the cumulative damage model, the frequency of certain events, the presence or triggering of certain fault codes, the quality of the regenerations (e.g., ability to meet a specified/predetermined regeneration target temperature), etc.

The reduction or increase (e.g., adjustment) in the exhibited useful life of the catalyst member can be based on cumulative data from other systems having comparable catalyst members. For instance, the prediction circuit 112 is configured to utilize a regression modeling technique for exhibited useful life prediction. The prediction circuit 112 is configured to adjust the regression (e.g., linear regression) of the remaining useful life of the catalyst member based on one or more systems exhibiting similar downward or upward trends of the normalized efficiency values. Therefore, the prediction circuit 112 can improve the accuracy of the exhibited useful life (e.g., determined based on the degradation value using the cumulative damage model) of the catalyst member by accounting for unexpected degradation/damages associated with the trend of the normalized efficiency values.

In some implementations, the prediction circuit 112 is configured to determine or flag the evidence of degradation to at least one of the operator, service technician, or administrator monitoring the health of the catalyst member, such as from a remote device. In various implementations, upstream failure mode can be isolated based on the presence or indication of one or more certain fault codes or values of other parameters. For example, low oil pressure may indicate an oil leak, and an oil leak can result in irreversible phosphorous poisoning on the catalyst member(s). In further example, the prediction circuit 112 may determine the types of degradation experienced by the catalyst member, such as reversible degradation (e.g., soot removable via cleaning procedures, sulfur poisoning, face plugging, etc.) or irreversible degradation (e.g., thermal damage, or other irremovable compounds or structures). The prediction circuit 112 utilizes a classification model (e.g., trained using one or more machine learning techniques) to determine whether the degradation is reversible or irreversible. The prediction circuit 112 may notify the operator via at least one failure mode indicating the type of degradation. In some cases, the prediction circuit 112 may indicate to the operator when the catalyst member requires maintenance based on the exhibited useful life, or whether to clean or replace the catalyst member. The operations, procedures, or processes in determining the exhibited useful life, among other information corresponding to the catalyst member, can be described in at least FIG. 2.

Figure 2:
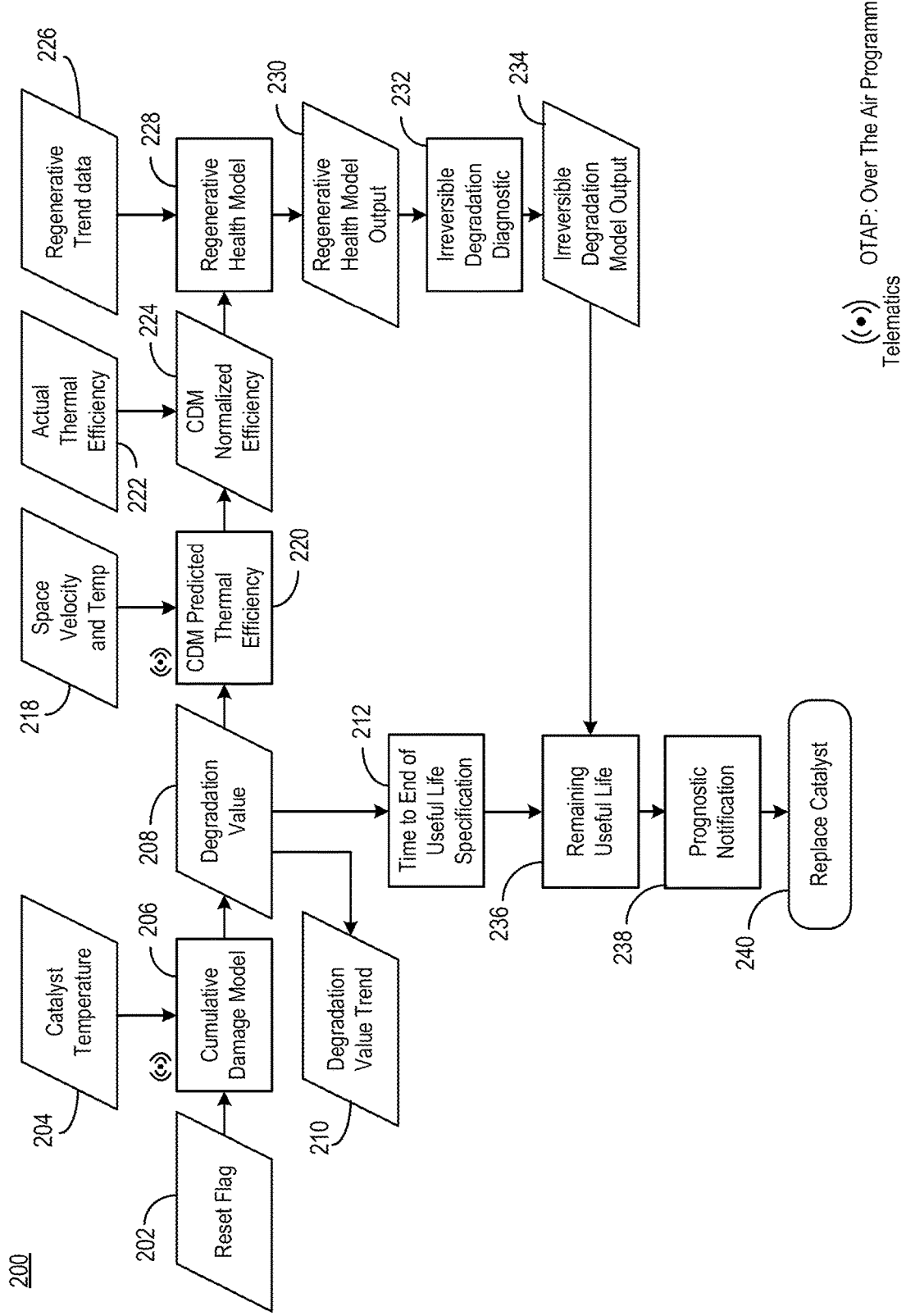
FIG. 2 is a process flow diagram for an example method for determining an efficiency value associated with a catalyst member.

Referring to FIG. 2, depicted is an example process flow diagram for a monitor and prognostic process 200 of the catalyst member health. The processes, operations, or steps of FIG. 2 can be performed, operated, or executed by the components (e.g., controller 100, I/O device 120, aftertreatment system 22, sensors, etc.) of the system 10. For example, additional or alternative operations of the process 200 can be performed by one or more circuits of the controller 100. Additionally or alternatively, some operations of the process 200 can be performed by a remote device, such as a remote data processing system. Some operations of the process 200 may involve the controller 100 receives data from components of the aftertreatment system 22 and forwarding the data to the remote device for processing, or vice versa.

At ACT 202, the controller 100 is configured to reset the degradation value (e.g., to degradation value of 1) when a new catalyst member is installed in the aftertreatment system 22 or when the new catalyst member replaces a previously installed catalyst member. For example, the controller 100 may receive an indication from a remote device (e.g., technician device) indicating that the new catalyst member is installed in the aftertreatment system 22. Upon receiving the indication of installing the catalyst member, a reset flag is triggered causing the controller 100 to reset the degradation value associated with the catalyst member (e.g., update the degradation value to 1). In some cases, the controller 100 is in communication with a sensor monitoring a connection with the catalyst member. Upon disconnecting and reconnecting the catalyst member, the controller 100 prompts the operator or technician whether to reset the degradation value. The controller 100 may receive a confirmation and reset the degradation value accordingly. In some cases, the controller 100 may not receive the confirmation or receive a declination, and maintain the degradation value accordingly.

At ACT 204, the controller 100 (e.g., degradation circuit 109) receives temperature sensor data from at least one sensor coupled to an exhaust conduit downstream from the catalyst member or at the outlet of the catalyst member. For example, the controller 100 can receive the data from the temperature sensor 16 positioned downstream from the catalyst member. The catalyst member can include or correspond to DOC member 30 or any other types of catalyst members (e.g., DPF member 40, SCR catalyst member 50, AMOx catalyst member 60, etc.), which can be monitored and analyzed using the operations or procedures discussed herein.

At ACT 206, the controller 100 (e.g., degradation circuit 109) is configured to use a model (e.g., cumulative damage model). The cumulative damage model can be based on a physical model of catalyst member degradation. The cumulative damage model can be embedded as part of the controller 100 (e.g., program, script, or code stored in the memory 115 of the controller 100). The controller 100 can execute the cumulative damage model continuously (e.g., during the operation of the catalyst member) or periodically based on a time interval (e.g., every 30 seconds, minute, 5 minutes, etc.) or a trigger (e.g., at ignition or start of the engine 20, during a regeneration procedure for the catalyst member, etc.).

The cumulative damage model can be specific to the formulation of the catalyst member, hence changes to the catalyst member formulation (e.g., PGM loading, PGM ratio, zone lengths, etc.) may change the output or values from the cumulative damage model. The output value of the cumulative damage model is configured as 0 to 1 for simplicity, where 1 represents full activity (e.g., no degradation) of the catalyst member and 0 represents no activity (e.g., degraded catalyst member).

In conjunction with at least FIG. 1B, the cumulative damage model may be trained using historical data (e.g., sensor data, catalyst member specification, operating duration, failure time, etc.) from other systems having comparable catalyst members. The controller 100 provides at least one of historical operation data (e.g., total operating time, performance over time, thermal exposure, chemical or compound exposure or formulation over time, etc.) associated with the catalyst member or a characteristic of the catalyst member as inputs to the cumulative damage model. The cumulative damage model processes the input data (e.g., the historical operation data and the characteristic of the catalyst member) to determine the degradation value of the catalyst member based on the sample data (e.g., from other systems having catalyst member(s) with similar historical operation data or characteristic). The degradation value may represent a current level of degradation or damage corresponding to the catalyst member.

In some cases, the cumulative damage model is executed on a remote device (e.g., a remote computing device). For example, the controller 100 stores or receives historical operation data associated with the catalyst member and the characteristic of the catalyst member. The controller 100 transmits, provides, or communicates these data to the remote device for processing. The remote device may use the cumulative damage model embedded as part of the remote device for processing the data from the controller 100. Subsequently, the controller 100 receives the output of the cumulative damage model from the remote device via a telematics unit (not shown) of the system 10. In some cases, the controller 100 may be featured as or include functionalities of a telematics unit.

At ACT 208, the controller 100 (e.g., degradation circuit 109) obtains, receives, or determines a degradation value using the cumulative damage model. The degradation value indicates or represents the degradation of the catalyst member. In some cases, based on at least one of the historical operation data of the catalyst member, the characteristic of the catalyst member (e.g., specification of the catalyst member), or the degradation value, the controller 100 determines the remaining useful life (RUL) (e.g., the difference between the total operation time and the EUL of the catalyst member) (ACT 236).

For example, the controller 100 determines a degradation level or a stage of degradation (e.g., remaining activity level or current damages) corresponding to the catalyst member based on the degradation value. The controller 100 executes or uses the linear regression technique to determine or generate a degradation trend or equivalent aging time trend (e.g., shown in conjunction with FIGS. 5A-B) based on at least one of the historical operation data or the characteristic of the catalyst member. For instance, based on the historical operation data, the catalyst member may age or degrade according to user-specific usage/operation, such as a catalyst member operating at a higher temperature for an extended duration may age or degrade relatively more than a catalyst member operating at a comparatively lower temperature or infrequent higher temperature. In another instance, the characteristic (e.g., the construction, formulation, recipe, or type of the catalyst member, among other information from the catalyst member specification) reflects how a certain type, make, or model of catalyst members ages or degrades over time, presentable as the trend. Therefore, based on the trend determined according to at least one or a combination of the historical operation data or the characteristic of the catalyst member, and the degradation value indicating a data point on the trend, the controller 100 can determine the (e.g., initial) RUL of the catalyst member.

The controller 100 can maintain or adjust the initial RUL based on any (e.g., unexpected) evidence of degradation (e.g., at least at ACT 236). The controller 100 may transmit a signal including the RUL to the I/O device 120 or other entities.

In various arrangements, at ACT 210, the controller 100 determines or collects the degradation values over time to provide a trend of degradation values. For example, the controller 100 can collect or obtain the degradation value(s) previously or historically recorded for the catalyst member. The controller 100 may obtain the degradation values stored locally by the controller 100 (e.g., in the memory 115) or stored in a remote data repository (e.g., in the cloud). The controller 100 can determine the degradation value of the catalyst member periodically. The periodicity is configurable by the administrator, service technician, etc., such as via over the air programming, for example. Based on the collected degradation values over time, such as from various determinations (e.g., repetition of ACT 208) or the (e.g., historical) operation data, the controller 100 obtains or determines the degradation value trend for predicting or determining the remaining useful life of the catalyst member. The degradation trend can be shown in conjunction with at least FIG. 5A, for example.

In some implementations, at ACT 212, the controller 100 uses an end of useful life specification to determine the remaining useful life or the time to failure of the catalyst member. The end of useful life specification can include or refer to a set of values that quantifies the expected aging (e.g., equivalent aging) of the catalyst member at the end of life. The end of useful life specification can be in term of an amount of time (e.g., operating time) at a predefined temperature (e.g., a certain amount of hours at a predetermined temperature). For example, the controller 100 utilizes the cumulative damage model to determine the equivalent aging hours of the catalyst member at any predefined temperature. The controller 100 performs the determination or calculation continuously or periodically for comparison against the end of useful life specification. Using a linear regression technique, among other suitable techniques, the controller 100 extrapolates to determine the remaining engine hours until the catalyst member reaches the end of useful life according to the end of useful life specification. The equivalent aging hours can be shown in conjunction with FIG. 5B, for example. The controller 100 uses the results from the extrapolation (e.g., with the results or outputs from the model) to determine the remaining useful life of the catalyst member, such as in ACT 236, for example.

At ACT 218, the controller 100 (e.g., efficiency circuit 111) determines or receives the space velocity and the temperature of the catalyst member. The controller 100 determines the space velocity (SV) based on the exhaust flow rate (e.g., sensed by at least one flow sensor 62) and the temperature of the catalyst member. The temperature of the catalyst member can include at least one of a temperature measured at an exhaust conduit upstream from the catalyst member, an exhaust conduit downstream from the catalyst member, or across the catalyst member (e.g., sensed by a virtual sensor). In some cases, the temperature across the catalyst member includes or corresponds to a bed temperature of the catalyst member. The bed temperature may be determined based on the following: Bed Temp=0.25*Inlet Temp+0.75*Outlet Temp. The inlet temperature corresponds to the temperature at the inlet of the catalyst member and the outlet temperature corresponds to the temperature at the outlet of the catalyst member.

At ACT 220, the controller 100 (e.g., efficiency circuit 111) determines an efficiency value (e.g., thermal efficiency (TE) value) associated with the catalyst member. The efficiency value can be based on at least one of the degradation value, the space velocity, and the temperature (e.g., bed temperature) of the catalyst member. For example, the controller 100 (e.g., metric selection circuit 110) identifies or obtains various metrics (e.g., calibration metrics or tables) populated/configured with various predicted efficiency values using a catalyst member physics model that is specific to the catalyst member formulation. For instance, based on the predetermined conditions or parameters of the catalyst member (e.g., temperature, flow rate, etc.) and the associated degradation value (e.g., reference degradation value), the catalyst member physics model determines the predicted efficiency values associated with the parameters and degradation value. The metrics may be listed or provided in a look-up table. The controller 100 is configured to update the metrics via over-the-air programming (OTAP) telematics, for example. Each metric is associated with a reference degradation value. The populated efficiency values of each metric correspond to the respective reference degradation value associated with the metric. For simplicity, the metrics can be 2D metrics, however, 3D metrics may be used depending on the implementations.

The metric includes an x-axis and a y-axis corresponding to different space velocities and bed temperatures. The axes are interchangeable. The intersection (or cross-section)

between the x-axis and y-axis (e.g., sometimes referred to as the z-axis) corresponds to one of the efficiency values populated in the metric.

The controller 100 (e.g., metric selection circuit 110) interpolates (e.g., linearly interpolates) between the metrics to select at least one metric from the look-up table (e.g., list of metrics). The controller 100 selects the metric based on a comparison between the degradation value and the reference degradation value associated with the metric. For example, the controller 100 selects the metric having the closest reference degradation value or least difference compared to the degradation value. The controller 100 determines a predicted efficiency value (e.g., first efficiency value) based on the space velocity and the bed temperature of the catalyst member during an event, such as the efficiency value corresponding to the space velocity and the catalyst member temperature in the metric. The event includes at least one of a regeneration event, braking event, or fuel injection event, among others. For simplicity and for purposes of example, at least one of the degradation value, space velocity, or temperature, among other information can be determined, measured, or computed during the regeneration event of the aftertreatment system 22.

At ACT 222, the controller 100 (e.g., efficiency circuit 111) determines the actual efficiency (e.g., actual thermal efficiency value) of the catalyst member. The controller 100 determines the actual efficiency based on a measure of heat generated per fuel dosed. The controller 100 determines the actual efficiency during the event, such as a regeneration event. For example, the controller 100 computes the actual efficiency of the catalyst member according to formula (1). The actual efficiency is based on at least one of exhaust flow rate, hydrocarbon dosing rate, lower heating value of the fuel, the inlet temperature of the catalyst member, or the outlet temperature of the catalyst member.

At ACT 224, the controller 100 (e.g., efficiency circuit 111) determines the normalized efficiency (e.g., normalized efficiency value) based on the predicted efficiency and the actual efficiency. For example, the controller 100 aggregates the predicted efficiency and the actual efficiency to determine the normalized efficiency, such as dividing, adding, averaging the values, etc. For simplicity, the controller 100 divides the actual efficiency value by the predicted efficiency value to calculate the normalized efficiency value. In some cases, determining the normalized efficiency may refer to normalizing the actual efficiency by the predicted efficiency. The normalized efficiency value indicates the difference or accuracy between the actual efficiency and the predicted efficiency. The delta of the normalized efficiency value from 1 (e.g., 100%) represents a ratio or percentage of the difference of the actual efficiency from the predicted efficiency. For instance, a normalized efficiency value of 1.1 or 0.9 indicates a 10% difference in the actual efficiency from the predicted efficiency. Similarly a normalized efficiency value of 1.25 or 0.75 indicates a 25% difference in the actual efficiency from the predicted efficiency. A normalized efficiency value greater than 1 indicates that the actual efficiency is greater than the predicted efficiency (e.g., catalyst member performing relatively better than expected), and a normalized efficiency value less than 1 indicates that the actual efficiency is less than the predicted efficiency (e.g., catalyst member performing relatively worse than expected).

At ACT 226, the controller 100 (e.g., prediction circuit 112) identifies or adds trend data from one or more systems (e.g., population data) including comparable catalyst members. The controller 100 receives the trend data via telematics unit (e.g., among other network interface components of the controller 100), for example. In this case, the trend data can be from one or more systems that include a catalyst member having at least one similar historical operation data or similar characteristic as the catalyst member of the aftertreatment system 22. The trend data includes historical regeneration of the comparable catalyst members associated with the one or more systems (e.g., regenerative trend data). For example, the trend data can indicate the percentage of time that the catalyst member is considered unhealthy (e.g., the normalized value is less than or equal to a lower threshold or is greater than or equal to an upper threshold), such as within one or more timeframes (e.g., shown in conjunction with FIGS. 7A-C). The timeframes can be configured or predetermined, such as every 50 hours, 100 hours, 200 hours, etc. In some cases, the percentage of time unhealthy is determined for each trip, while the engine 20 is running, or during each operation of the aftertreatment system 22. In various aspects, the percentage of time unhealthy can represent or be calculated based on a timeframe or a window of time, such as a percentage of a time window of 100 hours, 200 hours, or 500 hours (among other configured windows) that the catalyst member is considered unhealthy.

In some implementations, at ACT 228, the controller 100 is configured to utilize a machine learning technique or model (e.g., regenerative health model) to analyze the population data to determine or configure at least one of the one or more thresholds or the percentage of time unhealthy. For instance, the controller 100 may utilize a population analysis model trained using a machine learning technique to correlate trend data from various systems. The controller 100, utilizing the population analysis model, identifies/determines at least one pattern in the trend data associated with a respective unhealthy catalyst member. The pattern can include correlated groups of data points (e.g., normalized efficiency values) from the various systems that are less than or equal to a minimum normalized efficiency value, which represents an (e.g., unexpected) degradation of the catalyst member. In some cases, the trend data include health-related data of the catalyst member subsequent to a regenerative operation of the catalyst member. Further, the pattern may indicate a minimum percentage of time unhealthy associated correlated between the various systems having unhealthy catalyst member(s) (e.g., percentage of a respective time window the catalyst member is considered unhealthy). Hence, based on the machine learning technique or model, the controller 100 is configured to determine at least one of the one or more thresholds (e.g., a minimum threshold for percentage time unhealthy) to configure for trend data analysis of regenerative health value. At ACT 232, and in various implementations, the controller 100 utilizes the machine learning technique(s) to combine health-indicative signals from upstream components (e.g., fuel system, air handling, etc.) and the regenerative health model value to determine irreversible degradation. In some cases, the controller 100 utilizes operating condition-related signals (e.g., load factor, fuel consumption, etc.) and ambient condition-related signals (e.g., ambient temperature, humidity, etc.) to train or improve the machine learning model prediction or output performance. Such model(s) can provide fault isolation capability which can be used to reduce diagnostic time during service events.

The controller 100 can transmit a signal indicating or including the flag of the irreversible degradation (e.g., at ACT 234) to at least one of the I/O device 120 or a remote device (e.g., of a service technician) to take appropriate action, such as informing the operator of the degradation or indicate to the service technician of the type of service to perform on the system 10 (e.g., replace the catalyst member or clean the catalyst member).

In some implementations, if the percentage of time unhealthy (e.g., from ACT 230) is less than the threshold, the controller 100 determines that there may not be evidence of degradation at the particular time window, hence the catalyst member is healthy or degrades at the expected rate (e.g., ACT 232). In some cases, the evidence of degradation may be monitored via a remote device or a cloud computing system, where the controller 100 communicates with the remote device via the telematics unit.

In some implementations, in response to determining the evidence of degradation and/or determining irreversible degradation, the controller 100 is configured to determine the RUL of the catalyst member (e.g., at ACT 236). For example, to determine the RUL, the controller 100 combines or aggregates the degradation value (e.g., from cumulative damage model) with the irreversible degradation model value. The controller 100 may perform a regression modeling technique to expand/extend the trend thereby predicting the degradation levels at subsequent time period. Hence, based on the expanded trend, the controller 100 may determine or predict the RUL using the information described herein. In various implementations, the controller 100 uses the regression modeling technique to predict the total degradation (e.g., cumulative degradation) of the catalyst member. With the total degradation, the controller 100 determines the remaining useful life of the catalyst member of the system 10 (or the aftertreatment system 22). The controller 100 uses the monitored trend to determine the degradation level at a subsequent time period (e.g., prediction of the degradation level based on the trend of the degradation level or operation data of the catalyst member). The controller 100 may determine or predict the remaining useful life using the differences (e.g., between the predicted and actual efficiency or degradation) described herein. The information can be used by the system 10 (e.g., informing the operator via the I/O device 120 or dashboard indicator (not shown)) or a service technician operating a remote device to take proactive service action to replace the catalyst member prior to failure or extend the useful life of the catalyst member.

At ACT 238, the controller 100 provides a prognostic notification to at least one of the operator, the administrator, or the service technician. For example, responsive to determine the type of degradation, remaining useful life, or other issues related to the catalyst member, the controller 100 provides the notification for depicting the health of the catalyst member, such as to replace, clean, or perform maintenance before failure. In various arrangements, at ACT 240, the controller 100 may receive an indication that the catalyst member has been replaced. In some cases, the controller 100 may receive an indication that the catalyst member has been cleaned or maintenance has been performed. In various embodiments, responsive to receiving the indication of the replacement, the controller 100 may reset the historical operation data associated with the removed catalyst member (or store the historical operation data as sample data for the model).

Figure 3:
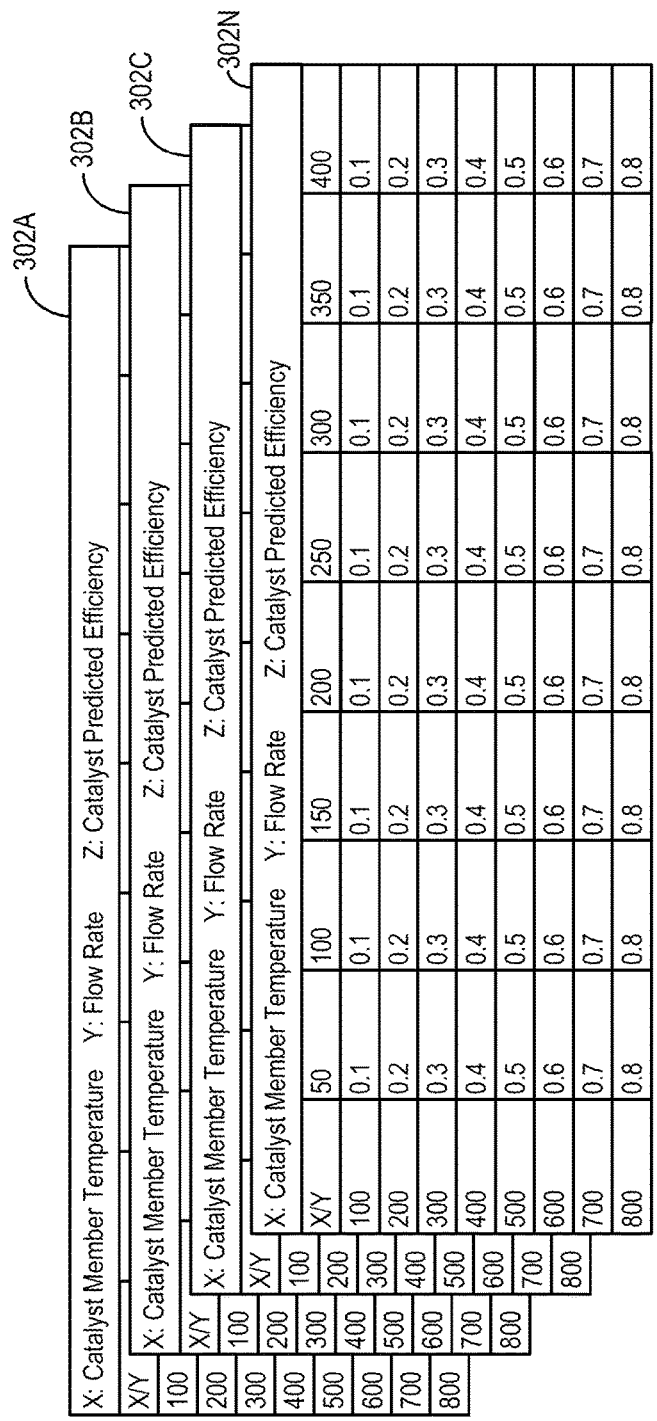
FIG. 3 illustrates example calibration tables.

FIG. 3 illustrates an example set of calibration tables 300 for predicting efficiency. For example, the set (e.g., list or array) of calibration tables 300 includes tables 302A-N (e.g., sometimes referred to generally as table(s) 302). Although four tables are shown, the set of calibration tables 300 can include additional or fewer tables 302, each associated with a respective reference degradation value. For example, table 302A may be associated with a reference degradation value of 1, table 302B may be associated with a reference degradation value of 0.7, table 302C may be associated with a reference degradation value of 0.4, and table 302N may be associated with a reference degradation value of 0.1, etc. With additional tables 302, other reference degradation values (e.g., between 0 and 1) can be included as part of the set of calibration tables 300.

The controller 100 selects/determines at least one of the tables 302 based on the degradation value determined, for instance, using a model (e.g., cumulative damage model). To perform the selection, the controller 100 compares the degradation value to the reference degradation values. The controller 100 selects a table 302 associated with a reference degradation value closest/nearest to the degradation value.

In various implementations, each table 302 includes efficiency values (e.g., predicted efficiency values) reflecting or associated with its respective reference degradation value. Individual efficiency values are associated with at least one of the space velocity and the temperature (e.g., bed temperature) of the catalyst member. Hence, subsequent to selecting at least one of the tables 302, the controller 100 is configured to determine the (e.g., predicted) efficiency value of the catalyst member based on at least one of the space velocity (e.g., calculated using exhaust flow rate and volume of the catalyst member) and the temperature (e.g., bed temperature) of the catalyst member.

FIGS. 4A-B illustrates example graphs 402-404 of normalized efficiency values. For example, the controller 100 can determine and collects the normalized efficiency over time based on the predicted efficiency and the actual efficiency of the catalyst member. The graphs 402, 404 can include normalized efficiency values after filtering or removing outlier data points (e.g., removing the highest or lowest 1% to 2% data points from the graph).

The graph 402 (e.g., first graph) and the graph 404 (e.g., second graph) are generated using the same data points from a certain system having the catalyst member. For example, the graph 402 provides normalized efficiency values for the catalyst member (e.g., based on the degraded part without utilization of cumulative damage model prediction or not accounting for degradation over time). The graph 404 provides normalized efficiency values accounting for the degradation of the catalyst member over time (e.g., utilizing the cumulative damage model prediction). In some cases, a normalized efficiency value greater than 1 may indicate that the actual efficiency of the catalyst member is higher than the predicted efficiency (e.g., performing better than expected, at least at the time period of determining the predicted and actual efficiencies). On the other hand, a normalized efficiency value less than 1 may indicate that the actual efficiency of the catalyst member is lower than the predicted efficiency (e.g., performing at lower efficiency than expected). As shown, when not accounting for the degradation over time, graph 402 indicates a drop in normalized efficiency over time (e.g., performance is degrading at an unexpected rate). By accounting for the degradation over time, graph 404 indicates a flatter slope (e.g., less decline) representing an expected performance degradation of the catalyst member, such as when using the techniques discussed herein to determine the normalized efficiency values, degradations, and remaining useful life, for example.

In various embodiments, the graphs 402, 404 include a respective fitted line corresponding to the average or mean of the normalized values over time. For example, a relatively flat fitted line (e.g., flat normalized efficiency values over time) can indicate that the catalyst member is aging as expected. Aging as expected refers to having normal or expected degradation, changes in performance, or aging. A steeper incline or decline of the fitted line slope (e.g., shown in graph 404) can indicate unexpected degradation, such as due to poisoning or damage to the catalyst member. In some cases, if the fitted line is relatively flat (e.g., the slope is less than, equal to, or within a threshold or threshold range) the controller 100 determines that the catalyst member is aging or degrading as expected. In this case, the controller 100 can notify the user of the remaining useful life or failure time of the catalyst member based on an output from the cumulative damage model, among other models, for example.

In another example, if the slope of the fitted line is greater than (or in some cases equal to) the threshold or the threshold range, the controller 100 determines that there is an unexpected degradation (e.g., unexpected poisoning or damage) to the catalyst member. Accordingly, the controller 100 may use a model (e.g., different from the cumulative damage model) to determine the remaining useful life or failure time of the catalyst member. In some instances, the controller 100 may obtain the remaining useful life as the output from the cumulative damage model, and adjust the remaining useful life according to the indication (e.g., steepness of the fitted line slope) of unexpected degradation. Using graphs 402, 404 as an example, because the slope in graph 402 is steeper than the slope in graph 404, in some implementations, the controller 100 may determine that there is at least some unexpected degradation of the catalyst member for the first system, thereby adjusting the failure time or remaining useful life of the catalyst member accordingly.

Figure 5B:
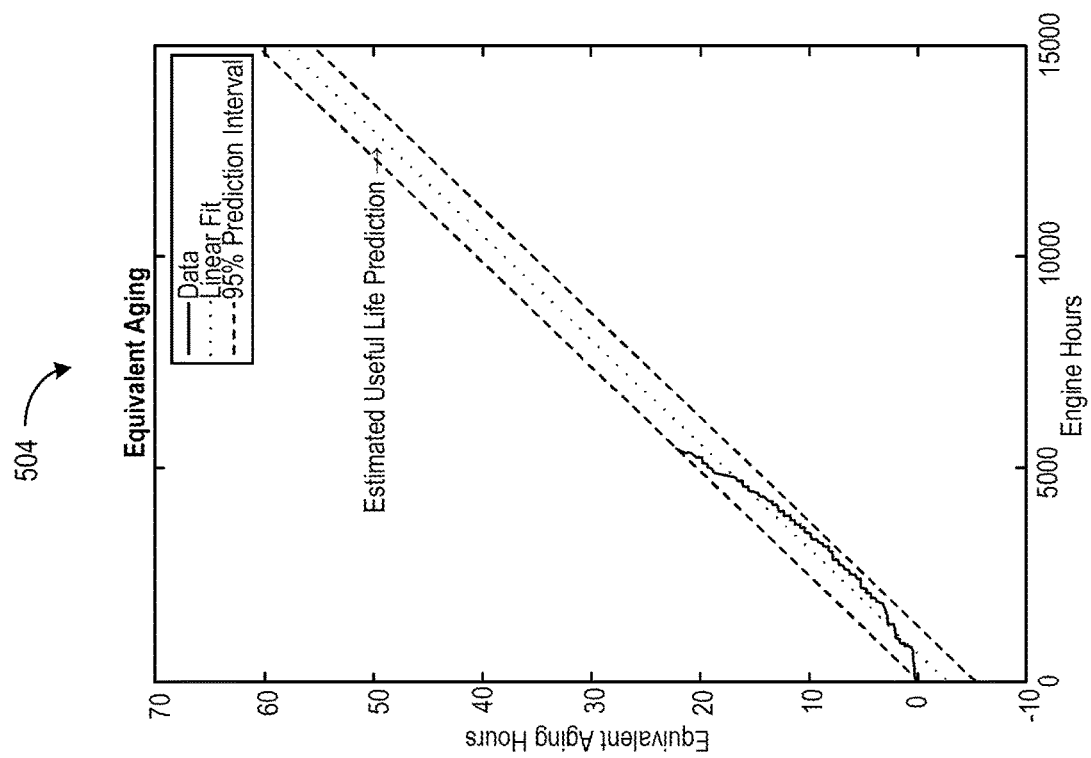
FIGS. 5A-B illustrate example graphs of the predicted degradation and exhibited useful life of a catalyst.
Figure 5A:
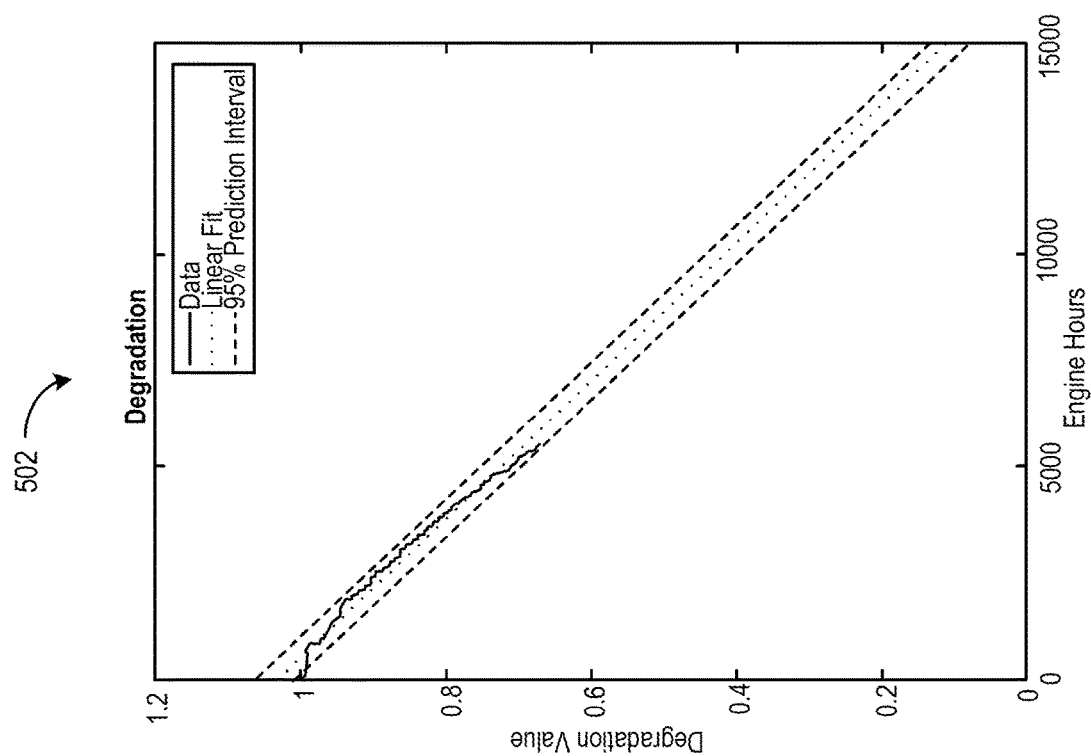

FIG. 5A illustrates example graph 502 of the predicted degradation of the catalyst member. FIG. 5B illustrates example graph 504 of the equivalent aging of the catalyst member at a temperature. The graph 502 includes degradation values recorded, determined, computed, or collected over time for a system (e.g., an internal combustion engine system). The graph 504 includes equivalent aging hours of the system determined over time. The controller 100 determines the linear fit line based on an aggregation (e.g., average or mean) of the data (e.g., shown in the legend). The 95% predicted interval indicates the expected deviation from the linear fit line (e.g., 5% expected error margin or 95% accuracy of the predicted degradation).

As shown in graph 502, the degradation value of the catalyst member starts at around 1 at the start of the engine hour (e.g., new part). The degradation value of the catalyst member drops over time, indicating that the catalyst member is degrading or aging. In this case, based on the linear fit line and the 95% prediction interval, the catalyst member is degrading as expected (e.g., the data line is within the 95% prediction interval). The controller 100 determines or computes the linear fit line using, for example, the linear regression technique.

In graph 504, the equivalent aging hours of the catalyst member are shown, such as at 650 degrees Celsius. The temperature associated with the equivalent aging hours can be configured by, for example, the operator, the service technician, or the administrator or moderator of the controller 100. The controller 100 can determine the equivalent aging hours (e.g., at 650 degrees Celsius or other predetermined aging temperatures) of the catalyst member based on the degradation value. For example, the equivalent aging hours may reflect an inverse of the degradation values, where a decrease in the degradation values corresponds to an increase in the equivalent aging hours. For example, with the engine hour (e.g., x-axis) in graph 504, the equivalent hour (e.g., when operating) at 650 degrees Celsius is determined by the model (e.g., regression model with adjustment to the cumulative damage model). If the temperature increase (e.g., higher temperature than the predetermined temperature) at which the equivalent hours are calculated, the equivalent hour (e.g., y-axis) for the same engine hour (e.g., x-axis) is reduced because of the higher (e.g., operating) temperature causing a more significant degradation than lower temperature. In this case, the rate of the decrease in degradation value can indicate the rate of increase of the equivalent aging hours. Using the fitted line of graph 504 (e.g., or by extrapolating the fitted line computed via the linear regression technique), the controller 100 can determine the remaining or exhibited useful life (or a range of exhibited useful life values) of the catalyst member based on at least one of the degradation values, efficiency values, among others.

Figure 6:
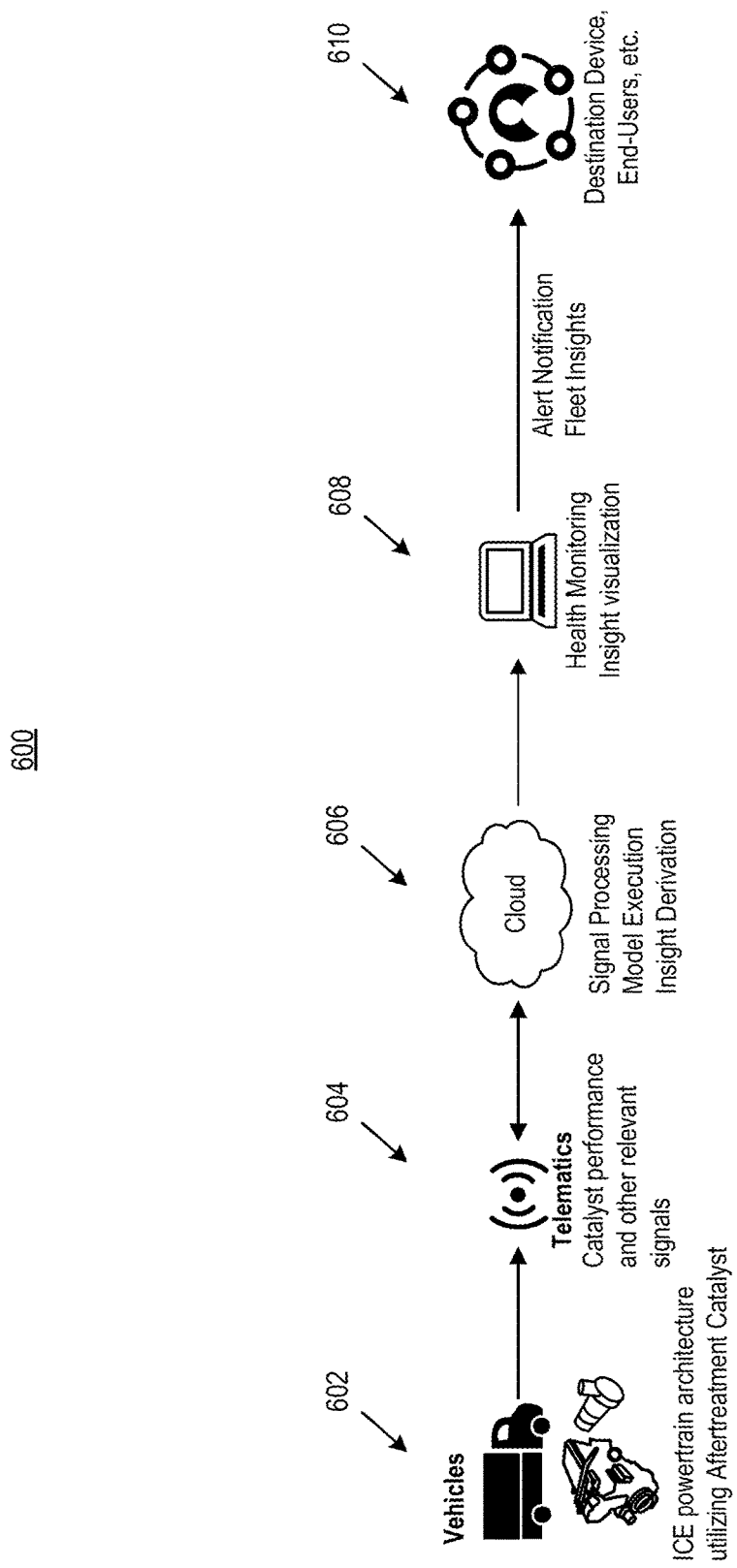
FIG. 6 is a process flow diagram for an example process for processing and transmitting information from an internal combustion engine system.

FIG. 6 is an example process flow diagram 600 for processing information from an internal combustion engine system. In various implementations, the process flow diagram 600 can include a flow of data for determining the exhibited useful life of the catalyst member and informing the operator (or user) of the information. For example, an internal combustion engine system 602 (e.g., a vehicle, generator, etc., including the catalyst member, such as system 10) can include the controller 100, or a different controller performing similar functions as the controller 100 in conjunction with at least FIGS. 1-2. The controller 100 transmits data of one or more components (e.g., engine operation data, sensor measurements, etc.) of the system 600 to a cloud 606 (e.g., a remote computing device) using a telematics unit 604. The data can indicate the catalyst member performance and other relevant signals for determining the health of the catalyst member. The telematics unit 604 can be similar to the telematics unit of the system 10 described in conjunction with FIGS. 1A-B.

In further example, the cloud 606 receives the data from the controller 100. The cloud 606 is configured to process the data or signal from the controller 100 including at least one of model execution or insight derivation (e.g., outputs from the model). The cloud 606 can transmit or provide the output from the model (e.g., exhibited useful life, failure time, health data, or types of degradation of the catalyst member) to a device 608 accessible to an administrator or service technician, for example. In this case, the administrator is able to identify the health of the catalyst member via the device 608. The device 608 may forward the data to at least one device 610 of the operator (e.g., I/O device 120). The device 608 may send an alert notification to the device 610, thereby informing the operator of at least one of the remaining useful life, insights into the health of the catalyst member, or maintenance action.

In some cases, the cloud 606 is configured to transmit the processed data and information related to the health of the catalyst member directly to the device 610 (e.g., concurrent to, prior to, or without transmitting the health information to the device 608). In various implementations, the controller 100 can process the data without the cloud 606. For instance, the controller 100 processes the data received from one or more components of the vehicle 602 (e.g., or system 10). The controller 100 provides an output from processing the data to the I/O device 120 to inform the operator of the catalyst member health. In some cases, the controller 100 may transmit a signal to the device 608 to inform the administrator of the catalyst member health.

Figure 7A:
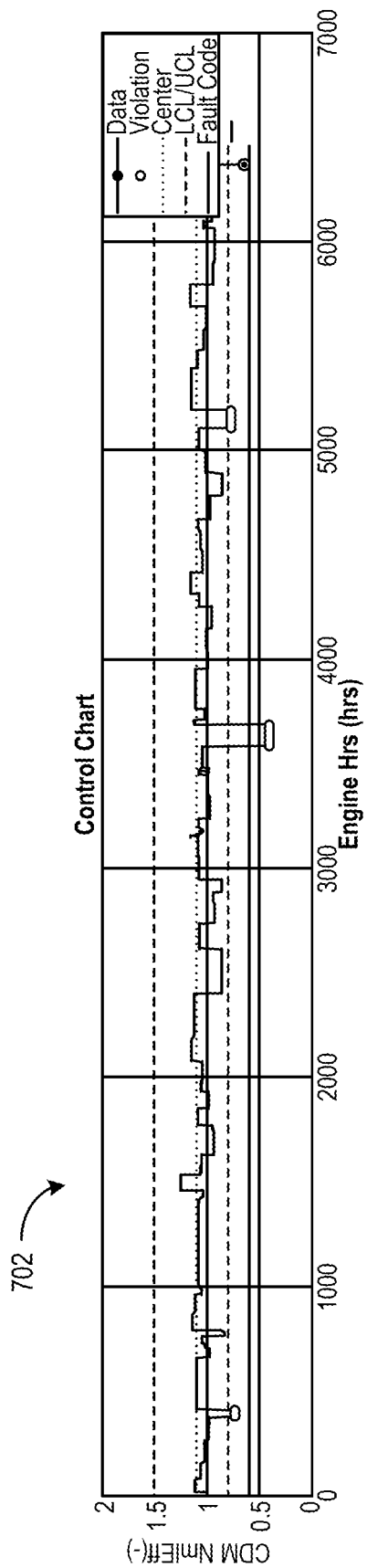
FIGS. 7A-C illustrate example graphs of the monitored data and predicted degradation of the catalyst.
Figure 7B:
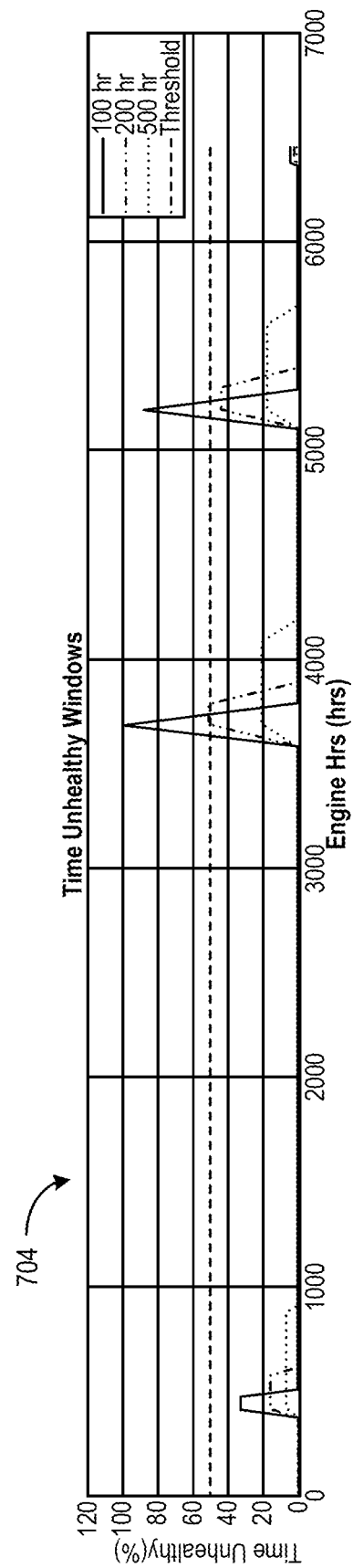
Figure 7C:
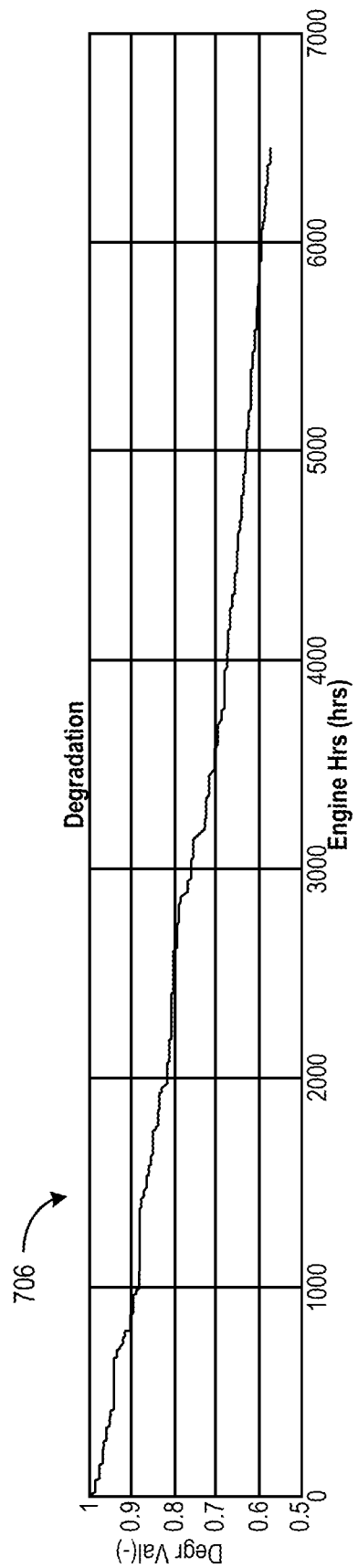

FIGS. 7A-C illustrate example graphs 702, 704, 706 of the monitored data and predicted degradation of the catalyst member. The graphs 702, 704, 706 may be associated with data from the system 10, such as monitored, stored, or processed by the controller 100. The graphs 702, 704, 706 (or data from these graphs) can be associated with each other, for example, the controller 100 can generate the graphs 702, 704, 706 based on relevant data of the catalyst member.

The graph 702 includes monitored data of the normalized efficiency values over time. For example, the controller 100 computes or determines the normalized efficiency values over time based on predicted and actual efficiencies of the catalyst member. The controller 100 collects the normalized efficiency values, which can be presented in graph 702. The graph 702 provides an indication of out-of-control points (e.g., outlier data points) indicating unexpected degradation of the catalyst member. For instance, the controller 100 marks or flags data points that are less than or equal to a lower control limit (LCL) (e.g., sometimes referred to as a lower threshold). In some cases, the controller 100 flags data points that are greater than or equal to an upper control limit (UCL) (e.g., sometimes referred to as an upper threshold). In some cases, the controller 100 flags data points below a fault threshold (e.g., labeled as fault code for a diagnostic fault code related to the catalyst member, for example, any suitable fault codes may be included for the type of catalyst member). The LCL, UCL, and/or fault threshold may be configured by the administrator, manufacturer of the catalyst member, or service technician.

The graph 704 includes the percentage of time unhealthy (e.g., the catalyst member is considered unhealthy in connection with unexpected degradations) of the catalyst member. For example, the controller 100 can be configured to monitor the percentage within certain time windows that the catalyst member is considered unhealthy, such as 100, 200, or 500 hours window. An instance of around 3500 engine hours can be used for purposes of providing examples. For example, the controller 100 determines or identifies that the normalized efficiency values drop below the LCL for around 100 engine hours. In this case, the percentage time unhealthy for the 100 hours time window reaches 100%, the percentage time unhealthy for the 200 hours time window reaches 50%, and the percentage time unhealthy for the 500 hours time window reaches 20%.

The controller 100 is configured to compare the time unhealthy percentage to a configured threshold (e.g., configurable by the administrator). For instance, the threshold may be set at 50%, such as at least for the 200 hours time window. Because the time unhealthy percentage for the 200 hours window is greater than or equal to the threshold at around 3600 engine hours, the controller 100 may be configured to provide an indication that the catalyst member is unhealthy to at least one of the operator (e.g., via the dashboard of the vehicle or the I/O device 120), administrator, or service technician (e.g, via a respective device). The graph 706 includes determined or monitored degradation values over time, such as calculated by the controller 100 using the model (e.g., cumulative damage model).

Figure 8:
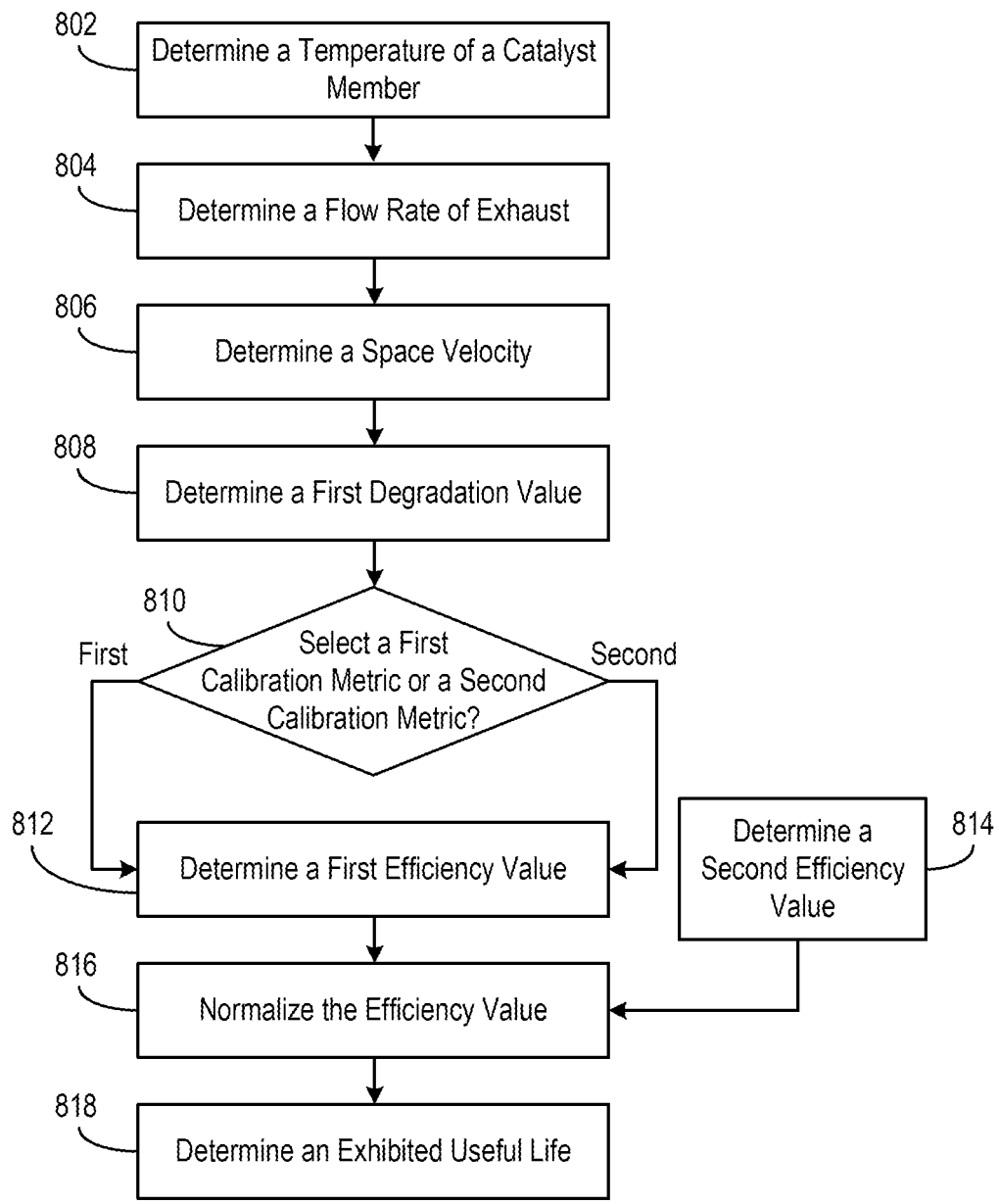
FIG. 8 is a flow diagram of an example method for determining an efficiency value associated with a catalyst member.

Referring now to FIG. 8, depicted is a flow diagram of an example method 800 for determining an efficiency value associated with a catalyst member. The example method 800 can be executed, performed, or otherwise carried out by one or more components of the system 10 (e.g., the controller 100, I/O operator 120, one or more components of the aftertreatment system 22, etc.), cloud 606 (e.g., server, remote computing device, etc.), network, data processing system, cloud computing environment, or any other computing devices described herein in conjunction with FIGS. 1-7. The method 800 includes determining a temperature of a catalyst member, at step 802. At step 804, the method 800 includes determining a flow rate of exhaust. At step 806, the method 800 includes determining a space velocity. At step 808, the method 800 includes determining a first degradation value. At step 810, the method 800 includes selecting a first calibration metric or a second calibration metric. At step 812, the method 800 includes determining a first efficiency value. At step 814, the method 800 includes determining a second efficiency value. At step 816, the method 800 includes normalizing the efficiency value. At step 818, the method 800 includes determining an exhibited useful life.

Still referring to FIG. 8 in further detail, at step 802, the controller (e.g., controller 100) determines a temperature of a catalyst member (e.g., sometimes referred to generally as a catalyst member). The catalyst member can include or correspond to one of at least a DOC member, DPF member, SCR catalyst member, or AMOx catalyst member. The controller can be communicable with various components of a system, such as an engine (e.g., internal combustion engine), sensors, the catalyst member(s), or other components of the aftertreatment system. For example, the controller communicates with one or more sensors (e.g., temperature sensor(s), flow sensor(s), etc.) located throughout the aftertreatment system. The one or more sensors may be physical or virtual sensors. The controller communicates with the one or more components physically coupled or connected to the controller or those configured with wireless communication capabilities.

For example, the controller receives a signal (e.g., a first signal) from a temperature sensor (e.g., first temperature sensor). The first temperature sensor is operatively coupled to the catalyst member and configured to provide at least one signal. The signal from one or more temperature sensors includes respective measurements or sensed temperature data associated with the position or location of the sensor. Based on the first signal, the controller determines a temperature of the catalyst member.

In various implementations, the temperature of the catalyst member may correspond to a bed temperature of the catalyst member. For example, the controller is in communication with a temperature sensor (e.g., second temperature sensor) upstream (e.g., positioned in or at an exhaust conduit upstream) of the catalyst member and a temperature sensor (e.g., third temperature sensor) downstream (e.g., positioned in or at an exhaust conduit downstream) of the catalyst member. The controller receives signals (e.g., third and fourth signals) from the second and third temperature sensors. The controller determines an upstream temperature of the exhaust entering the catalyst member and a downstream temperature of the exhaust exiting the catalyst member based on the respective signals.

Based on the upstream and downstream temperatures in addition to or alternatively to the first signal, the controller determines the temperature (e.g., bed temperature) of the catalyst member. For example, the controller determines the bed temperature based on an aggregation (e.g., average or mean) of the upstream and downstream temperatures from the catalyst member. In some cases, the temperature sensor (e.g., first temperature sensor) may be a virtual temperature sensor measuring the bed temperature of the catalyst member based on the second and third temperature sensors upstream and downstream from the catalyst member, respectively. In some other implementations, the temperature of the catalyst member may be at least one of the upstream temperature or the downstream temperature of the catalyst member.

At step 804, the controller receives a signal (e.g., a second signal) from the flow sensor coupled to the exhaust conduit (e.g., the first exhaust conduit upstream of the catalyst member). In some cases, the controller receives a signal from a flow sensor coupled to another exhaust conduit downstream of the catalyst member. In some cases, the flow sensor may be a physical sensor. In some other cases, the flow sensor may be a virtual sensor, such as a flow sensor measuring the flow rate (e.g., exhaust volumetric flow rate) across the catalyst member. For instance, based on an aggregate (e.g., averaging, etc.) of upstream and downstream flow rates of the catalyst member, the virtual sensor determines or measures the flow rate across the catalyst member. Hence, the controller determines the flow rate of exhaust at least one of within the first exhaust conduit (e.g., upstream exhaust conduit), within a second exhaust conduit (e.g., downstream exhaust conduit), or across the catalyst member based on the signal from at least one flow sensor.

At step 806, the controller determines a space velocity of the exhaust within the catalyst member. The controller determines the space velocity based on the flow rate and the volume of the catalyst member. For instance, the controller determines the space velocity by dividing the flow rate by the volume of the catalyst member. The temperature, space velocity, among other measurements or data associated with the catalyst member can be recorded, collected, or stored as historical operation data associated with the catalyst member.

At step 808, the controller determines a degradation value (e.g., first degradation value) indicative of a degradation of the catalyst member. The degradation of the catalyst member may reflect or indicate the efficiency (e.g., or performance) of the catalyst member. The increase in degradation or reduction in efficiency is caused by aging or damage to the catalyst member, such as sulfur poisoning, thermal damage, face plugging, among others. The controller determines the first degradation value based on at least one of historical operation data associated with the catalyst member and a characteristic of the catalyst member. The historical operation data includes or corresponds to any data associated with the operation of the catalyst member over time, such as sensor data, aging of the catalyst member, among other recorded operations. The characteristic of the catalyst member includes or corresponds to the specification of the catalyst member, such as a formulation of a platinum group metal (PGM) (e.g., at least one of a PGM loading, a PGM ratio, or various zone lengths of the catalyst member), among other structures or constructions of the catalyst member. The specification can be from a manufacturer of the catalyst member, for example.

For example, the controller is configured to utilize the historical operation data as an input into a model (e.g., cumulative damage model). The model may be embedded in the controller or can be a portion of the features or functionalities of the controller. Based on various trends (e.g., from system(s) with comparable catalyst member) or based on the sample data used for training, the model is configured to determine the effects of the historical operation data on the catalyst member associated with the provided characteristic. Hence, the output (e.g., degradation value) from the model may reflect the degradation of the catalyst member based on the historical usage/operation of the catalyst member. Hence, the controller determines the first degradation value based on the historical operation data and characteristic of the catalyst member.

At step 810, the controller selects at least one calibration metric (or table) from a list (e.g., array or set) of calibration metrics. In some cases, the controller is configured to generate the calibration metric(s) based on the characteristic of the catalyst member. For instance, based on the formulation of the catalyst member, a certain level of efficiency (e.g., performance level or amount) of the catalyst member may be determined or predicted in connection with the level of degradation (e.g., corresponding to the degradation value) of the catalyst member. In some cases, the calibration metric(s) may be generated by a remote computing device with information regarding the characteristic of the catalyst member. In this case, the controller receives the calibration metric(s) from the remote computing device and stores or updates the calibration metric(s) in a local data storage, for example. In some cases, the calibration metric(s) may be provided by the manufacturer of the catalyst member or an administrator that analyzed the characteristic of the catalyst member in connection with various degradation values.

The controller is configured to retrieve, lookup or search for various calibration metrics. For example, to select a calibration metric, the controller determines a first difference between the first degradation value and a first degradation reference value (e.g., associated with a first calibration metric). The controller determines a second difference between the first degradation value and a second degradation reference value (e.g., associated with a second calibration metric). The controller compares the first and second differences. If the first difference is less than the second difference, the controller selects the first calibration metric associated with the first degradation reference value. Put it another way, the controller selects at least one of the calibration metrics associated with or having a degradation reference value (e.g., sometimes referred to as reference degradation value) closest to the determined degradation value. In some implementations, the controller is configured to use multiple calibration metrics, such that at least two processes are performed concurrently, such as to determine multiple normalized efficiency values (e.g., or a single normalized efficiency value based on an aggregate of normalized efficiency values).

In various implementations, the controller selects a second calibration metric associated with the second degradation reference value after determining that the second difference is less than the first difference. In this case, the controller similarly processed to determine an efficiency value (e.g., a first or second efficiency value) associated with the catalyst member using the second calibration metric and based on the space velocity and the temperature, for example, similar to utilizing the first calibration metric as described herein.

At step 812, the controller determines an efficiency value (e.g., a first efficiency value or a predicted efficiency value) associated with the catalyst member. For example, using the selected calibration metric (e.g., the first or second calibration metric), the controller determines the first efficiency value based on or associated with the space velocity and temperature of the catalyst member. The space velocity and temperature (e.g., bed temperature) of the catalyst member can be associated with the x-axis and the y-axis of the calibration metric, or vice versa. The efficiency value is a value representing the efficiency (e.g., performance) of the catalyst member.

In various implementations, various processes or procedures to determine the efficiency value is performed during or subsequent to a certain event, such as a regeneration event of the catalyst member. For example, the controller initiates a regeneration event of the catalyst member. Subsequent to the regeneration event, the controller determines the efficiency value associated with the catalyst member, such as in addition to determining the temperature, flow rate, space velocity, degradation value, or calibration metric, which may be performed during or subsequent to the same regeneration event, for example.

At step 814, the controller determines another efficiency value (e.g., a second efficiency value or an actual efficiency value) associated with the catalyst member. For example, the controller is communicable with a doser of the aftertreatment system configured to inject a treatment fluid into the exhaust within the upstream exhaust conduit of the catalyst member. The controller causes the doser to inject the treatment fluid (e.g., NH3) at a predetermined, configured, or identifiable injection rate. The controller may cause the doser to inject the treatment fluid at other injection rates. Based on at least one of the injection rate, the flow rate, or the temperature of the catalyst member (or a combination of these variables), the controller determines the second (e.g., actual) efficiency value of the catalyst member. The controller may determine the second efficiency value during or subsequent to a regeneration event (e.g., immediate or within a predetermined duration after the event).

In some implementations, to determine the second efficiency value, the temperature of the catalyst member may be at least one of the upstream temperature or downstream temperature of the catalyst member. For example, the controller receives one or more signals from at least one of the temperatures upstream or downstream from the catalyst member. The respective signal includes the measurement of the upstream temperature or downstream temperature of the catalyst member. Hence, in this case, the controller determines the second efficiency value of the catalyst member based on at least one of the upstream temperature or the downstream temperature, such as in addition to or alternatively from the bed temperature.

In various implementations, the controller is configured to determine the second efficiency value additionally or alternatively based on a lower heating value. For example, the internal combustion engine includes an injector (e.g., fuel/fluid injector) configured to inject a combustible fluid (e.g., fuel). The controller determines a lower heating value based on a type of the combustible fluid (e.g., diesel, ethanol, p-xylene, etc.). Based on the lower heating value (e.g., alternatively or in addition to various other parameters or variables), the controller determines the second efficiency value of the catalyst member.

At step 816, the controller normalizes the efficiency value (e.g., the first efficiency value or the second efficiency value). For example, the controller normalizes the first efficiency value using the second efficiency value (or vice versa) to produce a normalized efficiency value. For simplicity, the normalized efficiency value can be determined by dividing the first efficiency value by the second efficiency value. Hence, a normalized efficiency value of 1 indicates that the actual efficiency value is as expected (e.g., similar to the predicted efficiency value). The controller is configured to determine and monitor the normalized efficiency values over time.

At step 818, the controller determines an exhibited useful life (e.g., remaining useful life or failure time) of the catalyst member. For example, the controller determines the exhibited useful life based on the first degradation value and the historical operation data (e.g., age, historical sensor data, or other recorded operation of the catalyst member). In this example, the exhibited useful life may be an output of the model (e.g., cumulative damage model), such as when the catalyst member is degrading as expected (e.g., degradation of the catalyst member is as expected). In another example, the controller determines the exhibited useful life of the catalyst member based on the normalized efficiency value (e.g., trend or changes in the normalized efficiency values over time) and the historical operation data. In this example, the controller determines the exhibited useful life accounting for any unexpected degradation of the catalyst member (e.g., based on the change in the normalized efficiency values). In various implementations, the controller may use the exhibited useful life from the model as an initial exhibited useful life and adjust the initial exhibited useful life based on the changes in the normalized efficiency value (e.g., to produce an actual or subsequent exhibited useful life adjusted for unexpected catalyst member degradation).

In various implementations, the controller determines whether the catalyst member is degraded (e.g., unexpectedly) based on the trend of the normalized efficiency values compared to an efficiency threshold. For example, based on at least one of the historical operation data of the catalyst member or the characteristic of the catalyst member, the controller determines an efficiency threshold for the catalyst member. In this case, the efficiency threshold can be based on the historical operation data (and/or the characteristic) of the catalyst member, such as the age, recorded operation, specification or formulation of the catalyst member, etc. In some cases, the controller determines or receives the efficiency threshold based on or using data from internal combustion engine systems having comparable catalyst members. The efficiency threshold can be at least one of an upper limit/threshold or a lower limit/threshold.

The controller compares the normalized efficiency value (e.g., or a trend of historical (and current) normalized efficiency values over time) to the efficiency threshold. The controller determines whether the normalized efficiency value satisfies the efficiency threshold based on the comparison between the normalized efficiency value and the efficiency threshold. For instance, satisfying the efficiency threshold refers to the normalized efficiency value(s) being within the upper and lower limits (e.g., UCL and LCL), and not satisfying the threshold may include normalized efficiency value(s) greater than or equal to the upper limit or less than or equal to the lower limit. Accordingly, based on a determination that the normalized efficiency value does not satisfy the efficiency threshold, the controller provides an indication that the catalyst member is degraded (e.g., unexpected degradation of the catalyst member), such as to a device of an operator (e.g., I/O device), a service technician, or an administrator.

In some implementations, the controller identifies, based on the historical operation data including a first set of normalized efficiency values that satisfy the efficiency threshold within a timeframe (e.g., time window, such as in FIG. 7), a first bucket counter (e.g., tracks or counts the number of times the past normalized efficiency values are considered healthy or within expectation) indicative of a first count of the first set of normalized efficiency values. The controller identifies, based on the historical operation data including a second set of normalized efficiency values that do not satisfy the efficiency threshold within the timeframe, a second bucket counter indicative of a second count (e.g., tracks or counts the number of times the past normalized efficiency values are considered unhealthy or unexpected) of the second set of normalized efficiency values.

Further, the controller determines whether the normalized efficiency value, such as determined in step 816, satisfies the efficiency threshold (e.g., percentage of time unhealthy is less than (or equal to) the threshold). If the normalized efficiency value does not satisfy the efficiency threshold, the controller increases the second bucket counter. Otherwise, if the normalized efficiency value satisfies the efficiency threshold, the controller increases the first bucket counter. The controller determines a degradation rate based on an aggregate between the second bucket counter and the first bucket counter (e.g., linear regression, average, or trend of degradation over time). The controller compares the degradation rate to a degradation threshold (e.g., threshold degradation rate).

For example, if the degradation rate is within the threshold (e.g., less than the rate of increase or decrease), the controller determines that the catalyst member degradation over time is within expectation. Otherwise, if the degradation rate is greater than (or equal to) the threshold, the controller determines that the catalyst member is degrading at an unexpected rate (e.g., unexpected degradation, which may be caused by thermal damage, poison damage, etc.). The controller triggers a flag (e.g., dashboard indicator or a user interface) indicative of an (e.g., unexpected) degradation of the catalyst member in response to the degradation rate exceeding a threshold. The controller provides the flag to a communication device (e.g., device of the operator, administrator, or service technician) indicative of the degradation of the catalyst member, such as for performing or indicating at least one service action to be performed to the catalyst member.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A system for determining an efficiency value associated with a catalyst member, the system comprising:
    an aftertreatment system comprising:
        a catalyst member, and
        a first exhaust conduit upstream of the catalyst member;
    a first temperature sensor operatively coupled to the catalyst member and configured to provide a first signal;
    a flow sensor coupled to the first exhaust conduit and configured to provide a second signal; and
    a controller communicable with the first temperature sensor and the flow sensor, the controller configured to:
        receive the first signal from the first temperature sensor and the second signal from the flow sensor,
        determine, based on the first signal, a temperature of the catalyst member,
        determine, based on the second signal, a flow rate of exhaust within the first exhaust conduit,
        determine, based on the flow rate and a volume of the catalyst member, a space velocity of the exhaust within the catalyst member, determine, based on historical operation data associated with the catalyst member and a characteristic of the catalyst member, a first degradation value indicative of a degradation of the catalyst member, determine a first difference between the first degradation value and a first degradation reference value, determine a second difference between the first degradation value and a second degradation reference value, after determining that the first difference is less than the second difference, select a first calibration metric associated with the first degradation reference value, and determine, using the first calibration metric and based on the space velocity and the temperature, a first efficiency value associated with the catalyst member.

2. The system of claim 1, wherein:

the aftertreatment system further comprises a doser configured to inject a treatment fluid into exhaust within the first exhaust conduit; and the controller is further configured to:
cause the doser to inject the treatment fluid at an injection rate, determine, based on at least one of the injection rate, the flow rate, or the temperature of the catalyst member, a second efficiency value of the catalyst member, and normalize the first efficiency value using the second efficiency value to produce a normalized efficiency value.

3. The system of claim 2, wherein:

the aftertreatment system further comprises a second exhaust conduit downstream of the catalyst member;

the system further comprises:
a second temperature sensor coupled to the first exhaust conduit upstream of the catalyst member and configured to provide a third signal, and a third temperature sensor coupled to the second exhaust conduit downstream of the catalyst member and configured to provide a fourth signal; and the controller is further configured to:
receive the third signal from the second temperature sensor and the fourth signal from the third temperature sensor, determine, based on the third signal, an upstream temperature of the exhaust entering the catalyst member, determine, based on the fourth signal, a downstream temperature of the exhaust exiting the catalyst member, and determine, based on at least one of the upstream temperature or the downstream temperature, the second efficiency value of the catalyst member.

4. The system of claim 2, further comprising:

an injector configured to inject a combustible fluid; and wherein the controller is further configured to:
determine, based on a type of the combustible fluid, a lower heating value, and determine, based on the lower heating value, the second efficiency value of the catalyst member.

5. The system of claim 2, wherein the controller is further configured to:

determine, based on the first degradation value and the historical operation data, an exhibited useful life of the catalyst member; or determine, based on the normalized efficiency value and the historical operation data, an exhibited useful life of the catalyst member.

6. The system of claim 2, wherein the controller is further configured to:

determine, based on at least one of the historical operation data of the catalyst member or the characteristic of the catalyst member, an efficiency threshold for the catalyst member;

compare the normalized efficiency value to the efficiency threshold;

determine, based on the comparison between the normalized efficiency value and the efficiency threshold, whether the normalized efficiency value satisfies the efficiency threshold; and provide, based on the determination that the normalized efficiency value does not satisfy the efficiency threshold, an indication that the catalyst member is degraded.

7. The system of claim 6, wherein the controller is further configured to:

identify, based on the historical operation data including a first plurality of normalized efficiency values that satisfy the efficiency threshold within a timeframe, a first bucket counter indicative of a first count of the first plurality of normalized efficiency values;

identify, based on the historical operation data including a second plurality of normalized efficiency values that do not satisfy the efficiency threshold within the timeframe, a second bucket counter indicative of a second count of the second plurality of normalized efficiency values;

increase the second bucket counter in response to the determination that the normalized efficiency value does not satisfy the efficiency threshold; and determine a degradation rate based on an aggregate between the second bucket counter and the first bucket counter;

compare the degradation rate to a degradation threshold;

trigger, responsive to the degradation rate exceeding a threshold, a flag indicative of a degradation of the catalyst member; and provide, to a communication device, the flag indicative of the degradation of the catalyst member for performing at least one service action to the catalyst member.

8. The system of claim 1, wherein the characteristic of the catalyst member comprises a formulation of a platinum group metal (PGM) comprising at least one of a PGM loading of the catalyst member, a PGM ratio of the catalyst member, or a plurality of zone lengths of the catalyst member.

9. The system of claim 8, wherein the controller is further configured to generate the first calibration metric based on the characteristic of the catalyst member.

10. The system of claim 1, wherein the controller is further configured to:

initiate a regeneration event of the catalyst member; and determine, subsequent to the regeneration event, the first efficiency value associated with the catalyst member.

11. The system of claim 1, wherein:

the temperature of the catalyst member is a bed temperature of the catalyst member;

the system further comprises:
a second temperature sensor upstream of the catalyst member and configured to provide a third signal, and a third temperature sensor downstream of the catalyst member and configured to provide a fourth signal; and the controller is further configured to:
  receive the third signal from the second temperature sensor and the fourth signal from the third temperature sensor,
  determine, based on the third signal, an upstream temperature of the exhaust entering the catalyst member,
  determine, based on the fourth signal, a downstream temperature of the exhaust exiting the catalyst member, and
  determine, based on the upstream temperature and the downstream temperature in addition to the first signal, the temperature of the catalyst member.

12. The system of claim 1, wherein the catalyst member is one of at least a diesel oxidation catalyst (DOC) member or a select catalytic reduction (SCR) catalyst member.

13. The system of claim 1, wherein the controller is further configured to:
  select a second calibration metric associated with the second degradation reference value after determining that the second difference is less than the first difference; and
  determine, using the second calibration metric and based on the space velocity and the temperature, a second efficiency value associated with the catalyst member.

14. A method for determining an efficiency value associated with a catalyst member, the method comprising:
  receiving, by a controller communicable with a temperature sensor and a flow sensor, a first signal from the temperature sensor and a second signal from the flow sensor;
  determining, by the controller based on the first signal, a temperature of a catalyst member of an aftertreatment system,
  determining, by the controller based on the second signal, a flow rate of exhaust within an exhaust conduit of the aftertreatment system,
  determining, by the controller based on the flow rate and a volume of the catalyst member, a space velocity of the exhaust within the catalyst member,
  determining, by the controller based on historical operation data of the catalyst member and a characteristic of the catalyst member, a first degradation value indicative of a degradation of the catalyst member,
  determining, by the controller, a first difference between the first degradation value and a first degradation reference value,
  determining, by the controller, a second difference between the first degradation value and a second degradation reference value,
  selecting, by the controller, a first calibration metric associated with the first degradation reference value after determining that the first difference is less than the second difference, and
  determining, by the controller, using the first calibration metric and based on the space velocity and the temperature, a first efficiency value associated with the catalyst member.

15. The method of claim 14, further comprising:
  causing, by the controller, a doser of the aftertreatment system to inject a treatment fluid at an injection rate;
  determining, by the controller, based on at least one of the injection rate, the flow rate, or the temperature of the catalyst member, a second efficiency value of the catalyst member; and
  normalizing, by the controller, the first efficiency value using the second efficiency value to produce a normalized efficiency value.

16. The method of claim 15, further comprising:
  determining, by the controller based on the first degradation value and the historical operation data of the catalyst member, an exhibited useful life of the catalyst member; or
  determining, by the controller based on the normalized efficiency value and the historical operation data of the catalyst member, the exhibited useful life of the catalyst member.

17. The method of claim 14, further comprising:
  selecting, by the controller, a second calibration metric associated with the second degradation reference value after determining that the second difference is less than the first difference; and
  determining, by the controller, using the second calibration metric and based on the space velocity and the temperature, a second efficiency value associated with the catalyst member.

18. A non-transitory computer-readable medium comprising at least one processor coupled to at least one memory storing instructions that, when executed by the at least one processor, cause the non-transitory computer-readable medium to:
  receive a first signal from a temperature sensor and a second signal from a flow sensor;
  determine, based on the first signal, a temperature of a catalyst member of an aftertreatment system;
  determine, based on the second signal, a flow rate of exhaust within an exhaust conduit of the aftertreatment system;
  determine, based on the flow rate and a volume of the catalyst member, a space velocity of the exhaust within the catalyst member;
  determine, based on historical operation data of the catalyst member and a characteristic of the catalyst member, a first degradation value indicative of a degradation of the catalyst member;
  determine, a first difference between the first degradation value and a first degradation reference value;
  determine, a second difference between the first degradation value and a second degradation reference value;
  select a first calibration metric associated with the first degradation reference value after determining that the first difference is less than the second difference; and
  determine, using the first calibration metric and based on the space velocity and the temperature, a first efficiency value associated with the catalyst member.

19. The non-transitory computer-readable medium of claim 18, further comprising the instructions that, when executed by the at least one processor, cause the non-transitory computer-readable medium to:
  cause a doser of the aftertreatment system to inject a treatment fluid at an injection rate;
  determine, based on at least one of the injection rate, the flow rate, or the temperature of the catalyst member, a second efficiency value of the catalyst member; and
  normalize the first efficiency value using the second efficiency value to produce a normalized efficiency value.

20. The non-transitory computer-readable medium of claim 19, further comprising the instructions that, when executed by the at least one processor, cause the non-transitory computer-readable medium to:

determine, based on the first degradation value and the historical operation data of the catalyst member, an exhibited useful life of the catalyst member; or
determine, based on the normalized efficiency value and the historical operation data of the catalyst member, the exhibited useful life of the catalyst member.

\* \* \* \* \*